US008186408B2

(12) United States Patent
Fries et al.

(10) Patent No.: US 8,186,408 B2
(45) Date of Patent: May 29, 2012

(54) LABEL PRINTER AND APPLICATOR

(75) Inventors: Todd Fries, Waukesha, WI (US); Edward P. Dyer, Germantown, WI (US); William K. Lueschen, Cedarburg, WI (US)

(73) Assignee: HellermannTyton Corporation, Milwaukee, WI (US)

( * ) Notice: Subject to any disclaimer, the term of this patent is extended or adjusted under 35 U.S.C. 154(b) by 0 days.

(21) Appl. No.: 12/803,277

(22) Filed: Jun. 23, 2010

(65) Prior Publication Data

US 2010/0288440 A1 Nov. 18, 2010

Related U.S. Application Data

(60) Division of application No. 11/787,791, filed on Apr. 18, 2007, now Pat. No. 7,757,739, which is a continuation-in-part of application No. 11/527,293, filed on Sep. 26, 2006, now abandoned, and a continuation-in-part of application No. 10/825,493, filed on Apr. 15, 2004, now Pat. No. 7,469,736.

(60) Provisional application No. 60/464,508, filed on Apr. 22, 2003.

(51) Int. Cl.
*B32B 15/00* (2006.01)

(52) U.S. Cl. ......... 156/384; 156/229; 156/443; 156/541

(58) Field of Classification Search .................. 156/229, 156/384, 443, 541
See application file for complete search history.

(56) References Cited

U.S. PATENT DOCUMENTS

| | | | | |
|---|---|---|---|---|
| 4,004,362 | A | 1/1977 | Barbieri | |
| 4,055,616 | A | 10/1977 | Keen et al. | |
| 4,473,429 | A | 9/1984 | Crankshaw | |
| 4,655,129 | A | 4/1987 | Wirth et al. | |
| 4,862,194 | A * | 8/1989 | Uematsu | 347/171 |
| 4,920,882 | A | 5/1990 | Hoyt | |
| 5,342,461 | A | 8/1994 | Murphy | |
| 5,372,443 | A | 12/1994 | Borucki, Jr. et al. | |
| 5,843,252 | A | 12/1998 | Murphy | |
| 5,875,618 | A * | 3/1999 | Sodies et al. | 53/586 |
| 6,211,117 | B1 | 4/2001 | Haggerty et al. | |
| 6,266,075 | B1 | 7/2001 | Feitel et al. | |
| 6,277,456 | B1 | 8/2001 | Bulgrin et al. | |
| 6,616,360 | B2 | 9/2003 | Lehmkuhl | |
| 6,664,995 | B2 | 12/2003 | Milton et al. | |
| 6,742,858 | B2 | 6/2004 | Lehmkuhl et al. | |
| 6,875,304 | B2 | 4/2005 | Schanke et al. | |
| 2009/0056872 | A1 | 3/2009 | Grove | |

FOREIGN PATENT DOCUMENTS

WO WO 8801247 A1 2/1988

OTHER PUBLICATIONS

Brady User's Guide, WRAPTOR Wire ID Printer Applicator, pp. 1-65, Dated 2004.

* cited by examiner

*Primary Examiner* — Sing P Chan
(74) *Attorney, Agent, or Firm* — Ryan Kromholz & Manion, S.C.

(57) ABSTRACT

An apparatus and method for printing and wrapping adhesive backed labels around elongate articles, such as electrical wires, including a rotatable puck assembly having an interrupted circumferential surface defining an opening for receiving an elongate object to be labeled and wing members for applying said label during rotation.

5 Claims, 24 Drawing Sheets

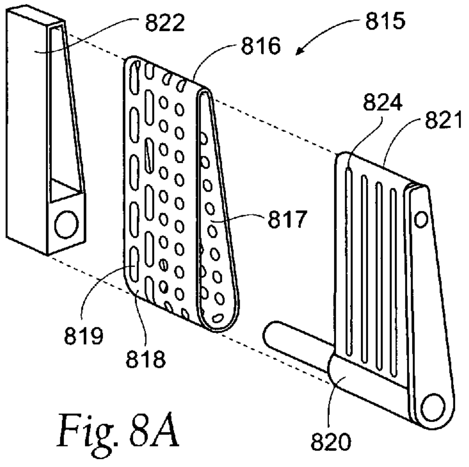
*Fig. 8A*
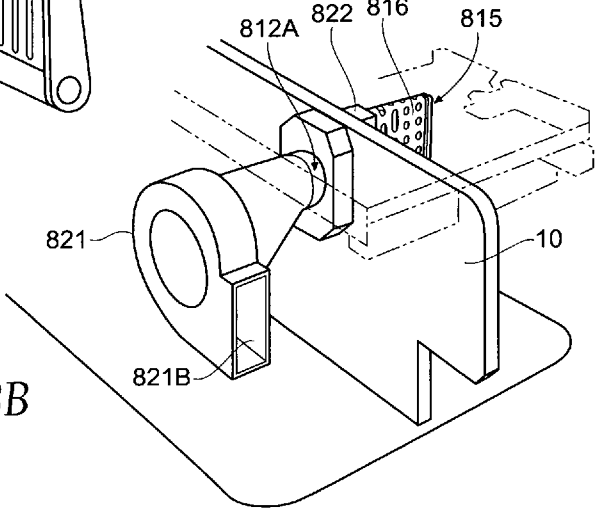
*Fig. 8B*
*Fig. 9*
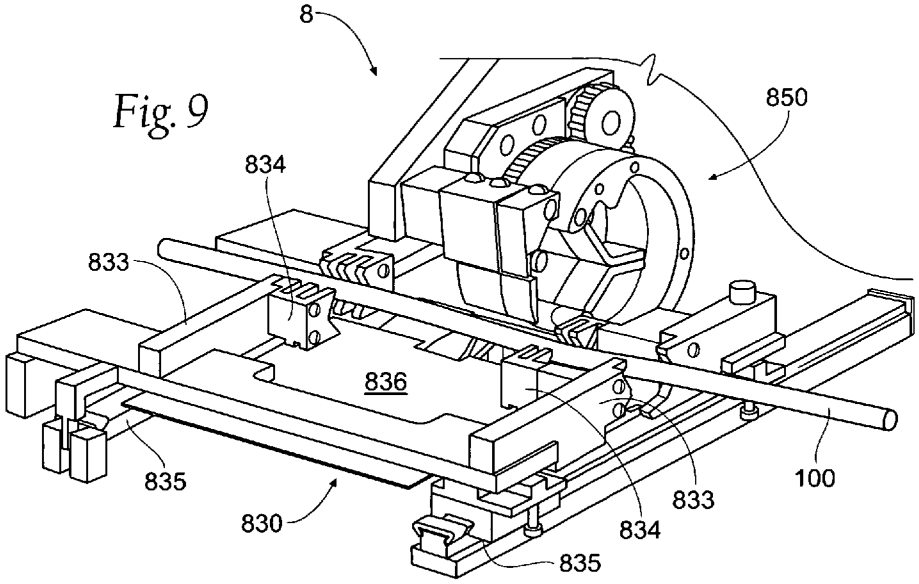

LABEL PRINTER AND APPLICATOR

RELATED APPLICATIONS

This application is a divisional of U.S. patent application Ser. No. 11/787,791, filed 18 Apr. 2007, now U.S. Pat. No. 7,757,739, which is a continuation-in-part of U.S. patent application Ser. No. 11/527,293, filed 26 Sep. 2006, now abandoned, which is a continuation-in-part of U.S. patent application Ser. No. 10/825,493, filed 15 Apr. 2004, now U.S. Pat. No. 7,469,736, which claims the benefit of U.S. provisional patent application Ser. No. 60/464,508, filed 22 Apr. 2003.

BACKGROUND OF THE INVENTION

This invention relates to an automatic bench tool for automatic printing and application of labels to wires, cables, or other elongate articles.

In the past, labels have been applied to elongate articles such as wires and cables manually or by way of applicators requiring cumbersome, noisy hydraulic or high-pressure air lines. Several problems have burdened the efficiency of such applicators. For example, previous label applicators have required the operator to manually handle the labels during application. This results in skin oil and dirt contamination of labels. Label contamination also may cause flagging and an end product having an unfinished appearance. The present applicator requires no such manual handling of the labels during the application process and therefore produces a clean, finished product. Additionally, application of a label using prior art applicators is relatively time consuming. Users of prior art applicators typically allocate more than fifteen seconds to manually apply a single standard label. The applicator of the present invention can complete the process in less than half the time, thus providing an increase in productivity and reduction in labor costs.

Furthermore, some past applicators required a supply of printed, often times spooled, labels. While generally acceptable for some applications, at least two main problems existed with pre-printed, spooled labels, depending upon whether the spooled labels were numbered consecutively or identically. First, if the spooled labels are numbered consecutively, a problem arises in the event of a skewed or inoperative label. That is, if one label in a consecutively numbered string of labels is placed on an elongate article incorrectly, or if the label simply fails, the roll of consecutive labels may not be used again, thereby generating waste. Also, the wasted roll needs to be replaced, thereby requiring service time and expense.

Second, if pre-printed, spooled labels are provided and numbered identically, such an arrangement is not conducive to labeling wires that may require unique identifiers. In other words, if several wires require affixation of unique labels, label rolls would need to be changed between label applications. While largely avoiding the waste problem mentioned above, significant time may be consumed by changing the rolls to achieve the unique identifications. Therefore, the art would benefit from a device that allows printing of a label just prior to application and the selective repetition of skewed or inoperative label identifiers.

Therefore, the art of labeling elongate articles would benefit from an improved label printer and applicator that prevents manual contamination of any adhesive supplied on the labels and that allows selective sequential or repetitious printing of label indicia.

SUMMARY OF THE INVENTION

Briefly, in accordance with a preferred embodiment thereof, provided is an apparatus and a method for printing and applying labels around elongate articles such as wire, cable, tubing or the like. The apparatus avoids manual contamination of any label adhesive and allows selective sequential or repetitious printing of label indicia. Additionally, this invention may be used in conjunction with other automated and non-automated tools as for instance an external wire-cutting or terminating machine.

In a preferred embodiment of the present invention, the apparatus includes a structural support, a material supply assembly, a print head, a label applicator, and a drive assembly. The label applicator further includes a label peeler, a label conveyer, a pair of gripping members, and a first puck having an interrupted circumferential surface where the interrupted surface defines an opening adapted to receive an elongate article, such as a wire. The structural support provides anchoring points for the other components and the drive assembly is coupled to the material supply assembly, the print head, and the label applicator.

The preferred label media to be used in accordance with the present invention are preferably discrete labels carried on continuous sheets of releasable liner or backing material. The labels may be preprinted and supplied in a spindled roll, or may be printed at need by the attached printing station, thus allowing labels to be easily kitted for each label job. Further, the labels may preferably include datum marks printed on the liner material.

A method according to the present invention includes the steps of:

1. Providing at least one label having an adhesive backing and liner.
2. Printing predetermined indicia onto the label.
3. Removing the liner from the label so as to expose the label adhesive backing.
4. Providing an elongate article to be labeled.
5. Conveying the label with exposed adhesive backing in a first direction.
6. Moving the elongate article, in a second direction, toward the exposed portion of the label adhesive backing.
7. Engaging a surface of the elongate article with the exposed portion of the label adhesive backing;
8. Providing a puck assembly having a cavity, said cavity including a pair of wing members, said wing members being normally biased towards one another.
9. Moving the engaged surface of the elongate article and attached label into the puck cavity and between the normally biased wing members.
10. Rotating the puck assembly and wing members around the elongate article and attached label, thereby securing the label entirely around the diameter of the elongate article.
11. Removing the elongate article and secured label from the puck cavity.

DESCRIPTION OF THE DRAWINGS

FIG. 8A is an exploded view of the endless belt and vacuum plate shown in FIG. 7.

FIG. 8B is a perspective view of a vacuum connected to the vacuum plenum shown in FIG. 8A.

FIG. 9 is a perspective view of the gripper assembly of the label applicator of FIG. 7.

DETAILED DESCRIPTION

Although the disclosure hereof is detailed and exact to enable those skilled in the art to practice the invention, the physical embodiments herein disclosed merely exemplify the invention, which may be embodied in other specific structures. While the preferred embodiment has been described, the details may be changed without departing from the invention, which is defined by the claims.

Figure 1:
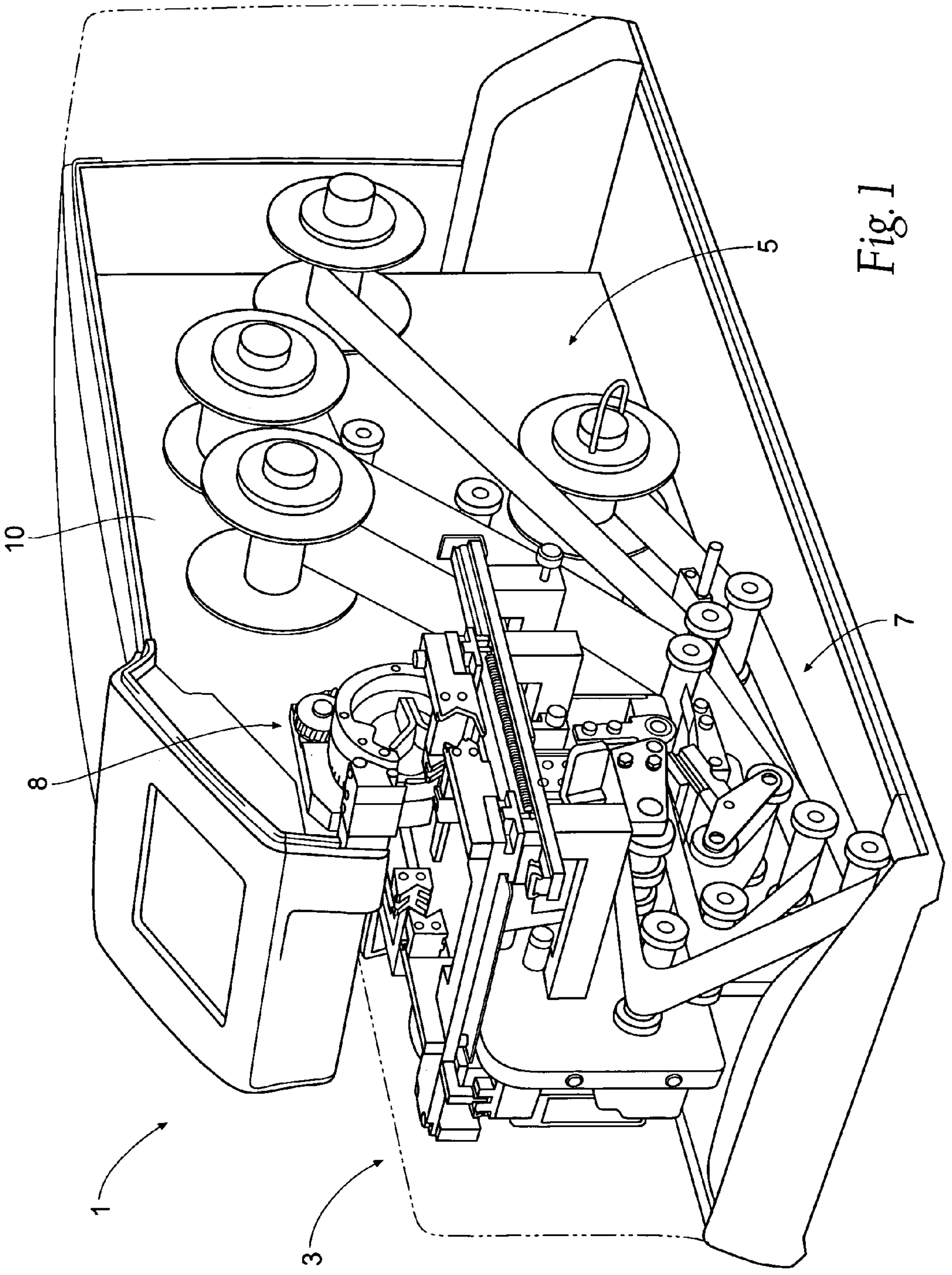
FIG. 1 is a perspective view of an embodiment according to the present invention.

Turning now to the drawings, in which like reference numerals refer to corresponding elements throughout the views, attention is first directed to FIG. 1 illustrating a perspective view of the apparatus 1. The apparatus 1 preferably includes a drive subsystem 3, a material subsystem 5, a print station 7, and an applicator 8. The apparatus 1 may further include a controller 2 (see FIG. 2) and a feedback subsystem 4 (see FIGS. 19A and 19B).

Generally, the drive subsystem 3 provides the mechanical forces that may be used in the operation of the apparatus 1. The material subsystem 5 provides label and image transfer media. The print station 7 transfers predetermined figures or symbols onto the label media from, or composed of, the image transfer media. Generally, and with a more detailed description to follow, the applicator 8 peels an adhesive label from label backing, conveys the label and an elongate article along converging paths, and wraps the label around the elongate article. The controller 2 synchronizes the operation of the apparatus 1, and the feedback subsystem 4 communicates certain parameters to the controller 2. The following description provides more detailed elaboration on embodiments of the apparatus 1 components.

Drive Subsystem

Figure 2:
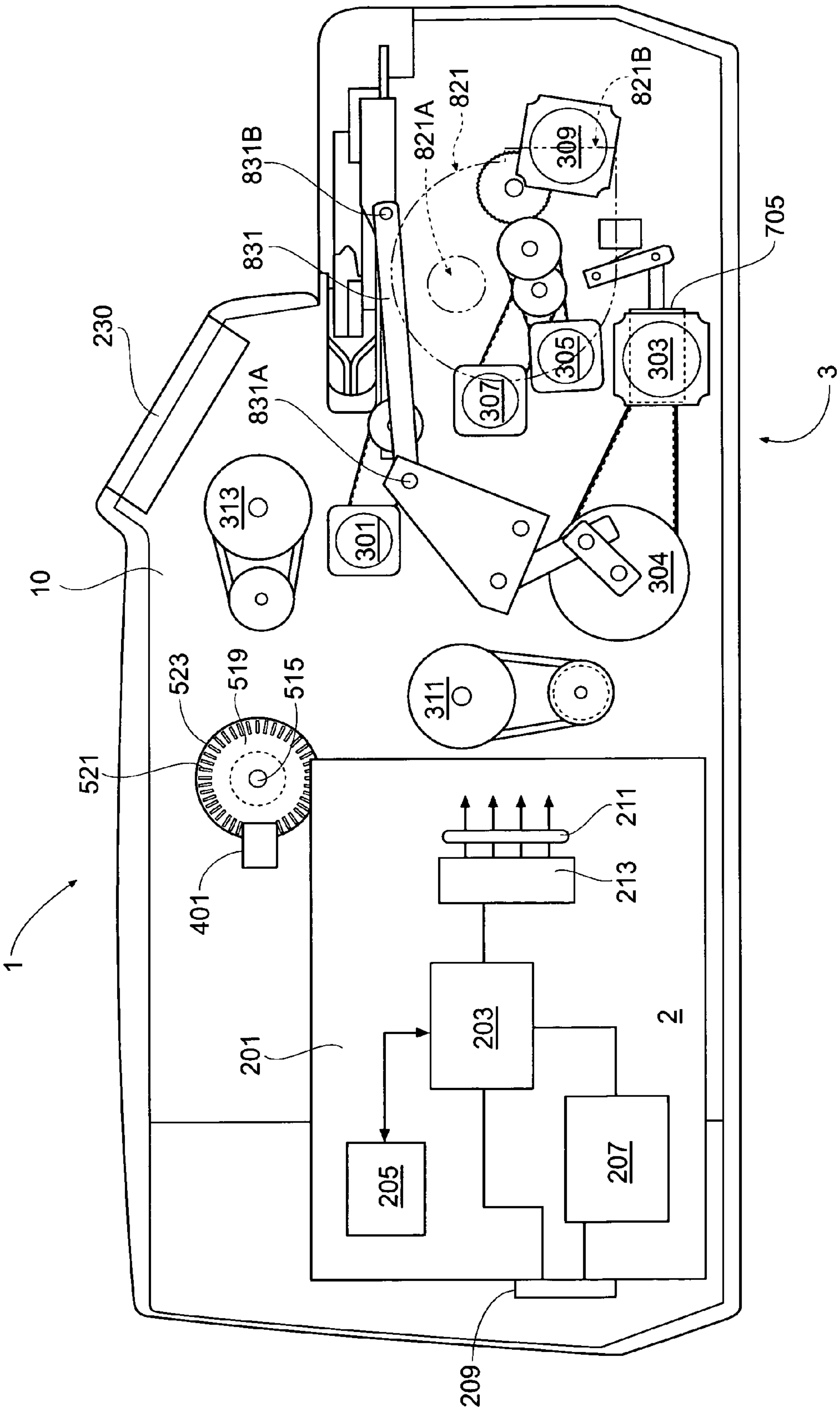
FIG. 2 is a left side elevation view of the embodiment in FIG. 1.

As shown in FIG. 2, the drive subsystem 3 may be comprised of several components. While a variable number of components could be used for the drive subsystem 3, a system of seven motors is preferred: a drive motor 301, a gripper arm motor 303, a platen motor 305, a label conveyor motor 307, a label peel motor 309, a backing take-up motor 311, and a ribbon take-up motor 313. The connection and operation of the drive subsystem 3 components will be described with reference to the other systems included in the apparatus 1.

Material Subsystem

Figure 3:
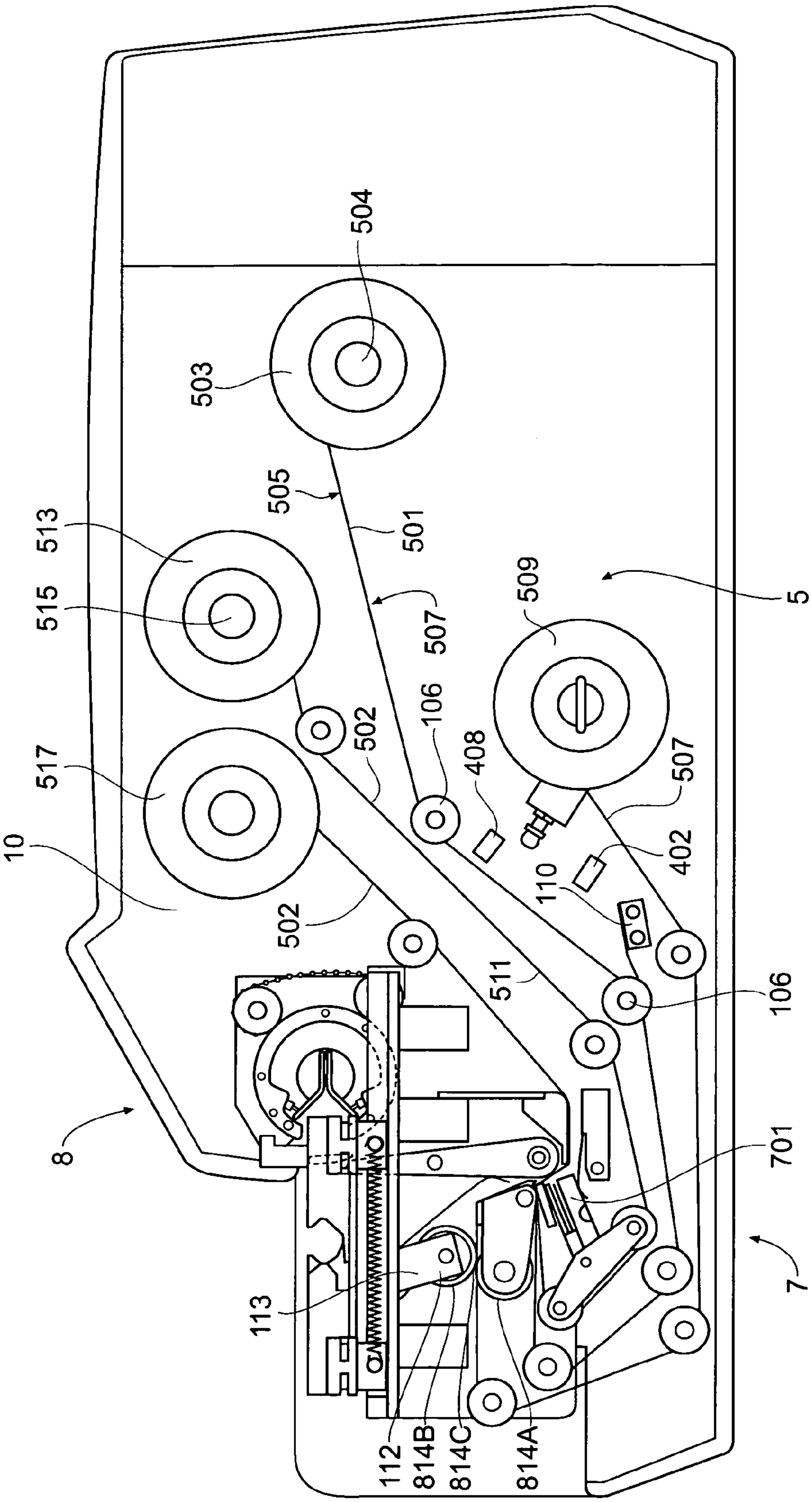
FIG. 3 is a right side elevation view of the embodiment in FIG. 1.

As may be seen in FIG. 3, the material subsystem 5 preferably provides label media 501 and image transfer media 502 to be consumed by the label application process. Label media 501 is preferably provided on a label supply roller 503 for carrying spooled labels 505 on a backing material 507. The label supply roller 503 is preferably disposed on a rotatable shaft 504 to facilitate feeding of label media 501 from a roll of labels 505 through the print station 7 and at least part of the applicator 8 to a backing take-up roll 509. The backing take-up role 509 is arranged to receive and wind up label backing material 507 once the labels 505 have been removed (see particularly FIG. 2).

The image transfer media 502 is largely dependent upon the type of print head 701 used and the types of labels 505 to be used. While the image transfer media 502 may be, by way of example without limitation, ink or an impact ribbon, the preferred image transfer media 502 is a thermal transfer ribbon 511. The thermal transfer ribbon 511, or other transfer ribbon, is provided on a ribbon supply spool 513 disposed on a pivotal shaft 515. Used image transfer ribbon 511 is collected onto a ribbon take-up spool 517, which is driven by the ribbon take-up motor 313. To provide an indication of the position of the ribbon supply spool 513, connected to the pivotal ribbon supply shaft 515 is an indexing disc 519. The indexing disc 519 preferably includes several slots 521 formed near a peripheral edge 523 of the disc 517.

Print Station

Figure 4:
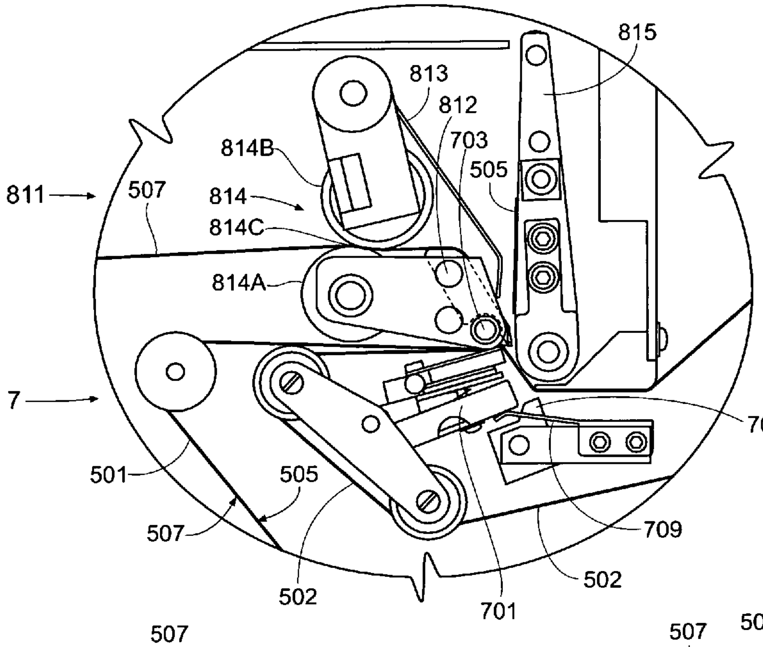
FIG. 4 is a side elevation view of a print station and portion of a label applicator according to the embodiment in FIG. 3.

Now turning to FIG. 4, a side elevation of an embodiment of the print station 7 is shown. The print station 7 generally comprises a print head 701, which is adapted to transfer desired figures onto the label media 501. While the print head 701 may be of various types now known, such as inkjet, impact, or roller, the print head 701 is preferably a thermal transfer print head. If desired, the print station 7 also includes a platen roller 703, which provides an opposing transfer surface for labels 505 passing across the print head 701. The platen roller 703 is driven by the platen motor 305 (shown in FIG. 2). Proper pressure of the print head 701 against the platen roller 703 during printing is provided by a print head solenoid 705 (as seen in FIG. 2) acting on a cammed shaft 707 pressing against the print head 701.

Although proper printing is ensured by asserted pressure on the print head 701 during printing, pressure is released by the solenoid 705 and cammed shaft 707 when the print head 701 is not actively depositing image transfer media 502 to a label 505. When pressure is removed by the solenoid 705, an anchored leaf spring 709 maintains the print head 701 in close proximity to the platen roller 703. Removal of pressure from the print head 701 while no printing is occurring allows the label media 501 and the image transfer media 502 to be moved at different rates.

Figure 5A:
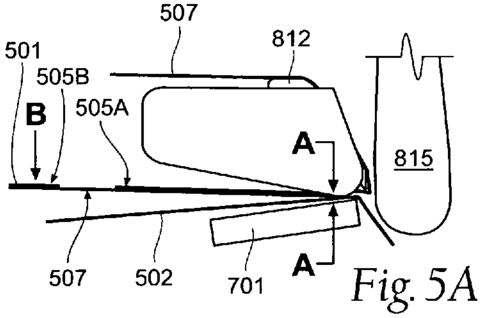
FIG. 5A is a side elevation view of label media and image transfer media at a first position disposed in the structure shown in FIG. 4.
Figure 5B:
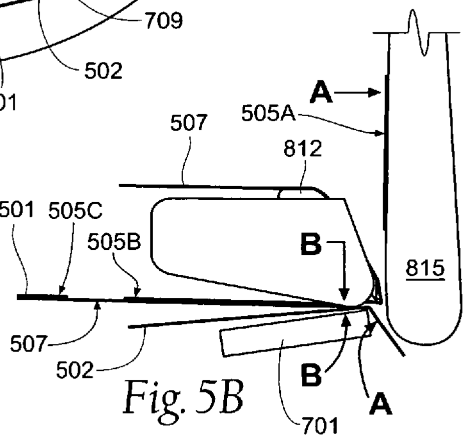
FIG. 5B is a side elevation view of label media and image transfer media at a second position disposed in the structure shown in FIG. 4.
Figure 6A:
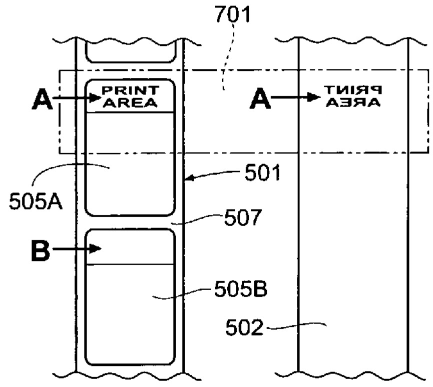
FIG. 6A is a top plan view of a side by side comparison of the label media and image transfer media at the first position in FIG. 5A.
Figure 6B:
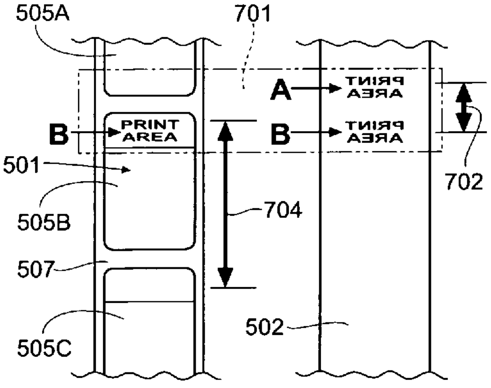
FIG. 6B is a top plan view of a side by side comparison of the label media and image transfer media at the second position in FIG. 5B.

Referring now to FIGS. 5A, 5B, 6A and 6B, FIGS. 5A and 5B provide a side elevation view of label media 501 and image transfer media 502 as it progresses through the print station 7, and FIGS. 6A and 6B provide a top plan view side by side comparison of the two positions of FIGS. 5A and 5B to better explain the relative positioning of the label media 501 and the image transfer media 502. FIGS. 5A and 6A depict the label media 501 and image transfer media 502 at a relative first position A. FIGS. 5B and 6B depict the label media 501 and image transfer media 502 at a relative second position B. In both FIGS. 5A and 5B, the print head 701 is in the engaged printing position caused by the rotational force applied to the print head by the cammed shaft 707. At position A, as shown in FIG. 5A, the print head 701 is printing some image on a first label 505A. Once the printing onto the first label 505A is complete, pressure is released by the cammed shaft 707, and the label media 501 and image transfer media 502 are allowed to move at different rates through the print station 7. Prior to printing a second label 505B, the image transfer media 502 is advanced a first predetermined distance 702 and the label media 501 is advanced a second predetermined distance 704. The first distance 702 is at least, and preferably no greater than, a distance required to advance the image transfer media 502 to an effective print region, despite the distance 704 traveled by the label media 501. That is, the image transfer media 502 is generally advanced on an as needed basis rather than coextensively with the label media 501, thereby preventing waste of the image transfer media 502.

Applicator

Figure 7:
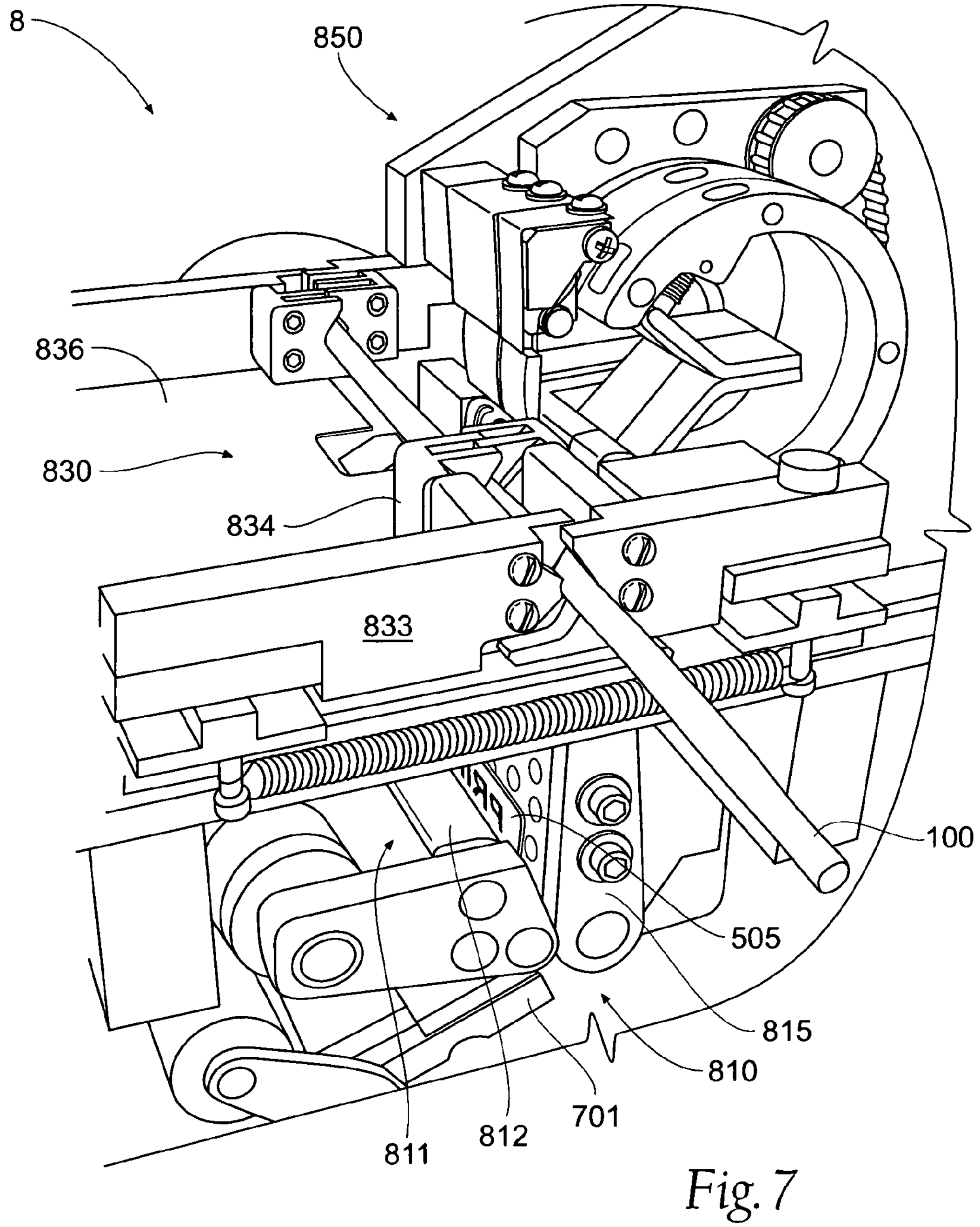
FIG. 7 is a perspective view of an embodiment of a label applicator according to the present invention.

As seen in the Figures and particularly FIG. 7, an apparatus 1 according to the present invention further includes a novel label applicator 8. The applicator 8 is adapted to receive an elongate object 100, to provide a label 505, and to wrap the label 505 around the elongate object 100. The applicator 8 generally includes a label transfer mechanism 810, a gripper assembly 830, and a label wrapper assembly 850.

As seen in FIG. 7, but also partially in FIG. 4, the label transfer mechanism 810 preferably comprises a label peeler 811 and a label conveyor 815. The label peeler 811 includes a label peel plate 812, a peel spring 813, and a label peel roller set 814. The label peel roller set 814 is preferably comprised of a knurled drive roller 814A and a selectively engageable idler roller 814B. The label peel roller set 814 meets at a nip 814C, adapted to receive label media 501 or simply the backing material 507. The idler roller 814B is selectively engageable as it is mounted at a distal end 112 of a pivoted lever arm 114. The drive roller 116 is designed to pull the backing material 507 through the apparatus 1 and after labels 505 have been removed, onto the take-up roll 509, as mentioned earlier.

FIG. 8A provides an exploded view of the label conveyor 815. Generally, the label conveyor 815 comprises an endless perforated belt 816 disposed on a vacuum plate 821. The endless perforated belt 816 has an inside surface 817A and an outside surface 817B, and several apertures 819. Disposed against the inside surface 817A of the endless belt 816 is a drive shaft 820, and the vacuum plate 821. The vacuum plate 821 comprises a plurality of slots 824 in fluid communication with a vacuum plenum 822. In turn, as seen in FIG. 8B, the vacuum plenum 822 is in fluid communication through the support structure 10 with an input 821A of a vacuum 821, which also has an output 821B.

As seen in FIG. 9, the applicator 8 further preferably includes a gripper assembly 830 for alternatively grasping and positioning an elongate article 100 to be labeled. The gripper assembly 830 is preferably operated by the gripper arm motor 303. As shown in FIG. 2, the gripper arm motor 303 drives an eccentric rotor 304, which is pivotally attached to a first end 831A of a linkage 831. A second end 831B of the linkage 831 provides force to gripper elements 833, which are guided in linear motion by a pair of generally parallel slide mechanisms 835. The forces provided by the linkage 831 allow the grasping and ungrasping of an object, such as the elongate article 100 shown in these views. As seen, the gripper elements 833 each preferably include a pair of spaced apart, openable jaw members 834. As may be seen particularly in FIGS. 20D-M, inclusive, the jaw members 834 are adapted to receive, grasp, and position an elongate object 100 relative the wrapper assembly 850.

Figure 10:
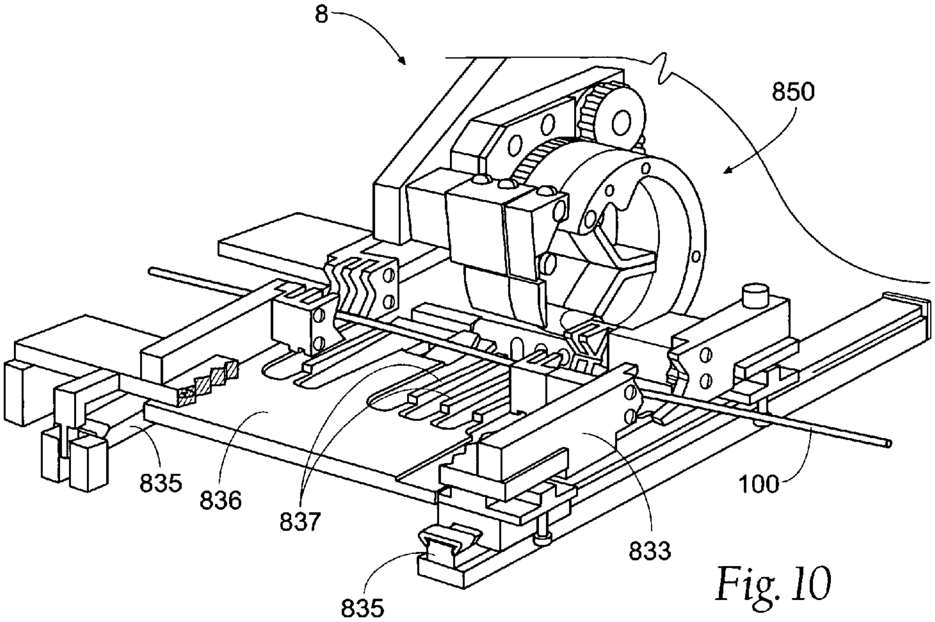
FIG. 10 is a perspective view of the gripper assembly of FIG. 9 including an inclined ramp table.

Returning to FIG. 9, the gripper assembly 830 may also include a support plate 836, which prevents objects from falling between the gripper elements 833. A relatively flat support plate 836 crafted from sheet metal is sufficient for all article 100 sizes, provided that due attention is paid when placing an article 100 in the gripper elements 833. However, if slender elongate articles 100 are to be wrapped, it may be desirable to provide a support plate 836 having support ribs 837, as shown in FIG. 10. The support ribs 837 prevent slender articles 100 from slipping under the gripper elements 833.

Figure 11:
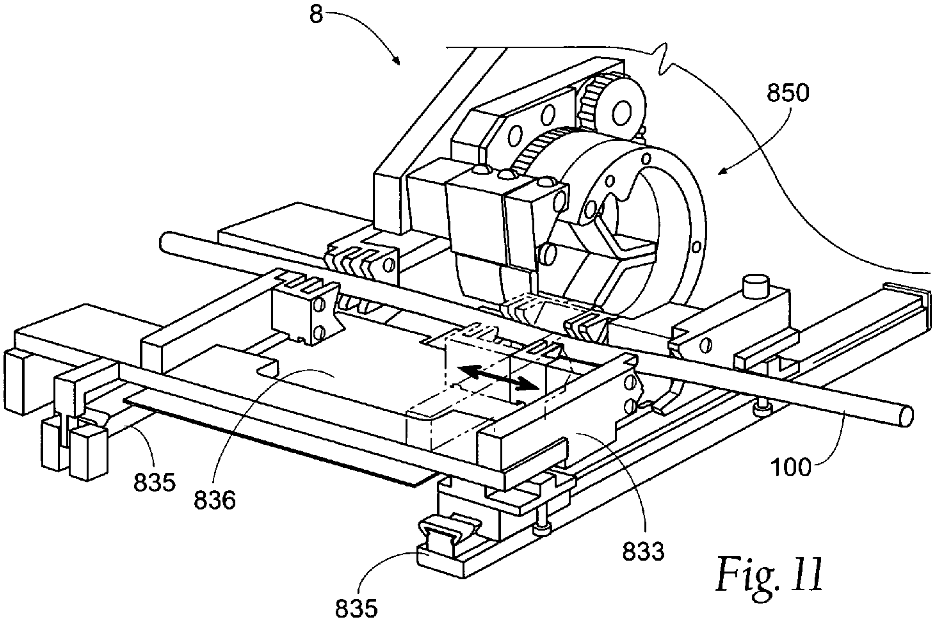
FIG. 11 is a perspective view of the gripper assembly of FIG. 9 including jaw members in a modified position.

While the gripper elements 833 are shown as being spaced apart a predetermined distance to one another, it is to be understood that the predetermined distance may be varied according to need, as shown in FIG. 11. The distance may need to vary depending upon the width of a label 505 to be applied, or also upon the rigidity of the elongate article 100. The gripper elements 833 alternatively may be adapted to put longitudinal tension on a grasped elongate object 100, thereby holding the object 100 taut for the labeling process. The allowed variation of jaw 834 spacing makes possible the placement of a label 505 proximate the end of an elongate article 100.

Figure 12:
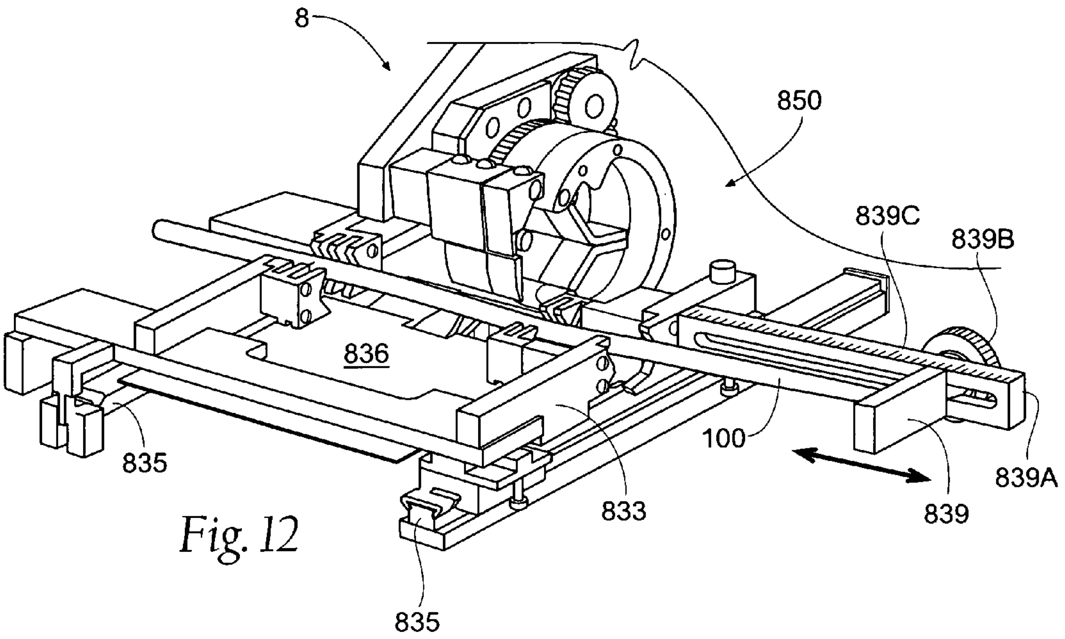
FIG. 12 is a perspective view of the gripper assembly of FIG. 9 including a labeling guide.

FIG. 12 is a perspective view of the wrapper assembly 8, further including an adjustable object abutment 839. The abutment 839 is preferably supported on a simple slide mechanism 839A and may be adjusted by loosening and tightening an adjustment knob 839B. The slide mechanism 839A may further comprise a graduated scale 839C to allow for accurate placement of the abutment 839. Although the abutment 839 is shown as adjustable, a fixed abutment 839, or plurality thereof, may also be employed. An abutment 839 may be employed to ensure placement of a label around an elongate object 100 at a repeatable location along the object 100.

Figure 13:
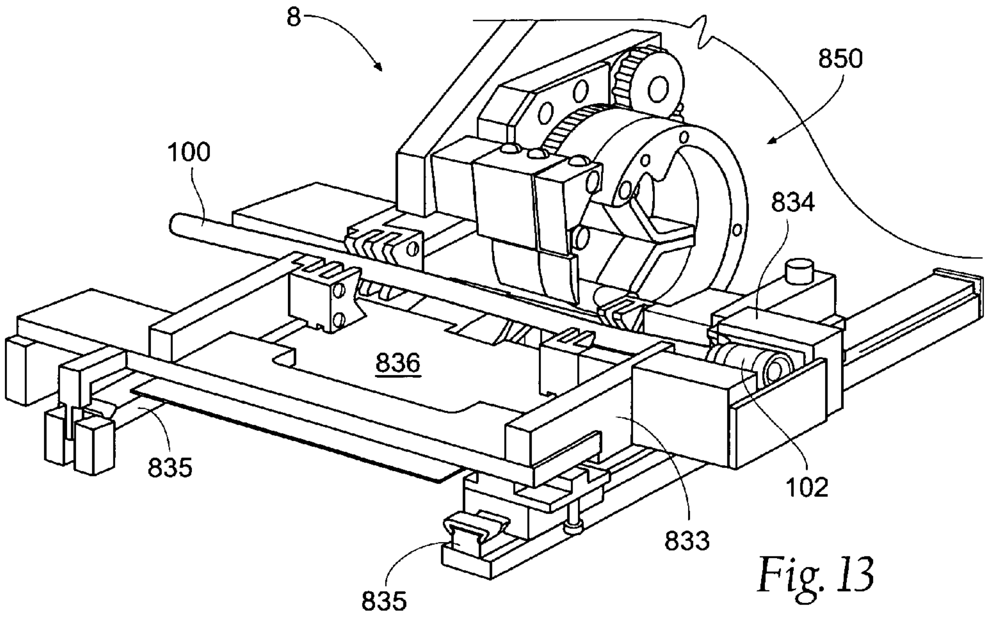
FIG. 13 is a perspective view of the gripper assembly of FIG. 9 including a connector support.

Furthermore, as depicted in FIG. 13, at least one jaw member 834 may be adapted to grasp a predetermined connector 102, which was applied to the elongate article 100 prior to the labeling process. By allowing the grasping of an applied connector 102 and the variation of jaw 834 spacing, it is possible to place a label 505 much closer to the connector 102 than was previously allowed by prior art devices.

Figure 14A:
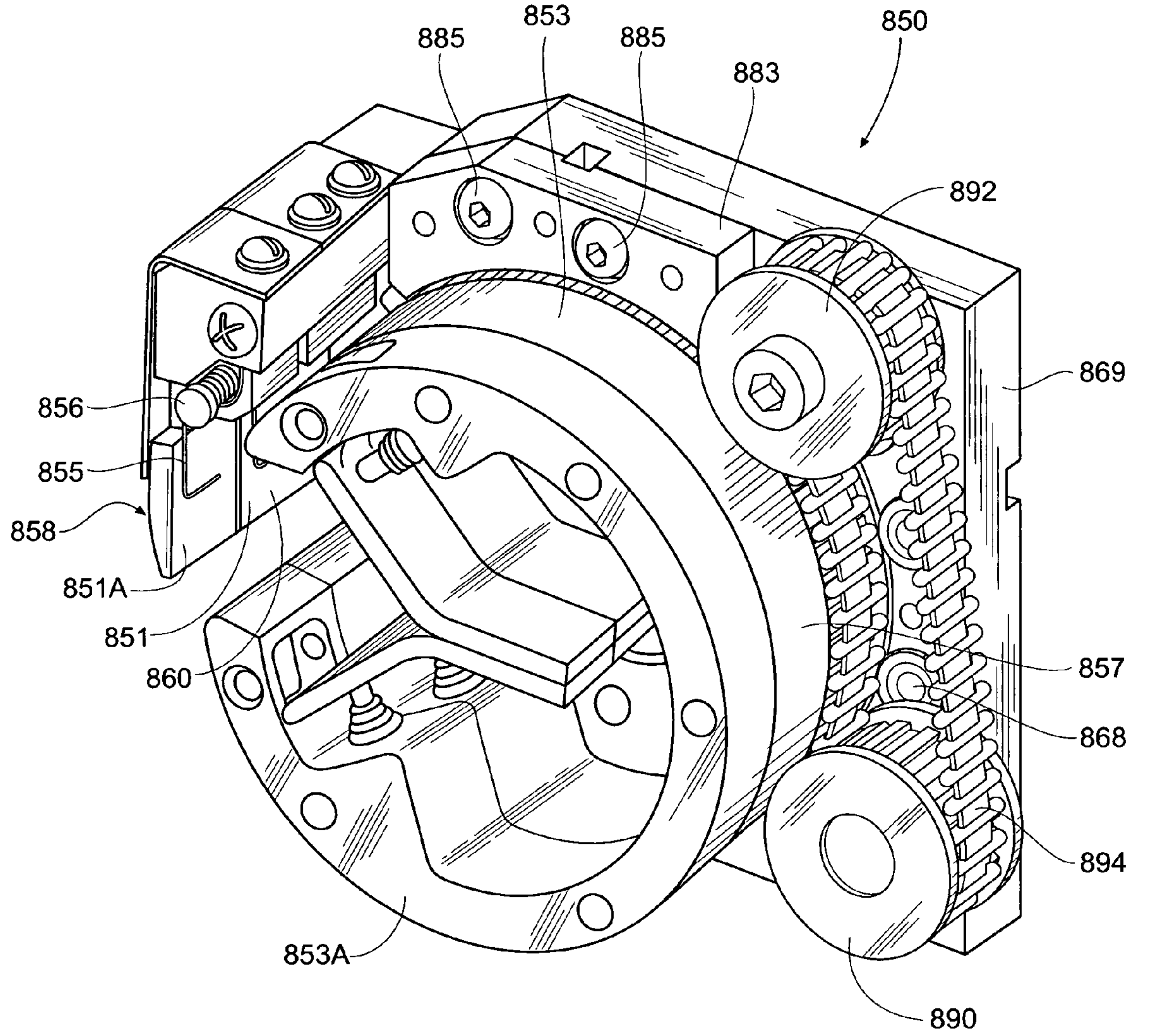
FIG. 14A is a perspective view of the label wrapper of the label applicator of FIG. 7.

Referring now to FIGS. 9 and 14A, the applicator 8 preferably includes a label wrapper assembly 850. The label wrapper 850 comprises generally an entrance door 851 and a c-shaped puck element 853. The entrance door 851 is preferably spring loaded by a double leaf torsion spring 855 mounted on an upstanding pin 856. The torsion spring 855 bears against the door 851 such that the door 851 is normally closed. The puck element 853 has an interrupted circumferential surface 857. The interrupted circumferential surface 857 includes a marginal edge portion 859 preferably having a toothed configuration. Seen particularly in FIG. 14B, the marginal edge 859 further includes an axially extending marginal support shelf 861.

Figure 14B:
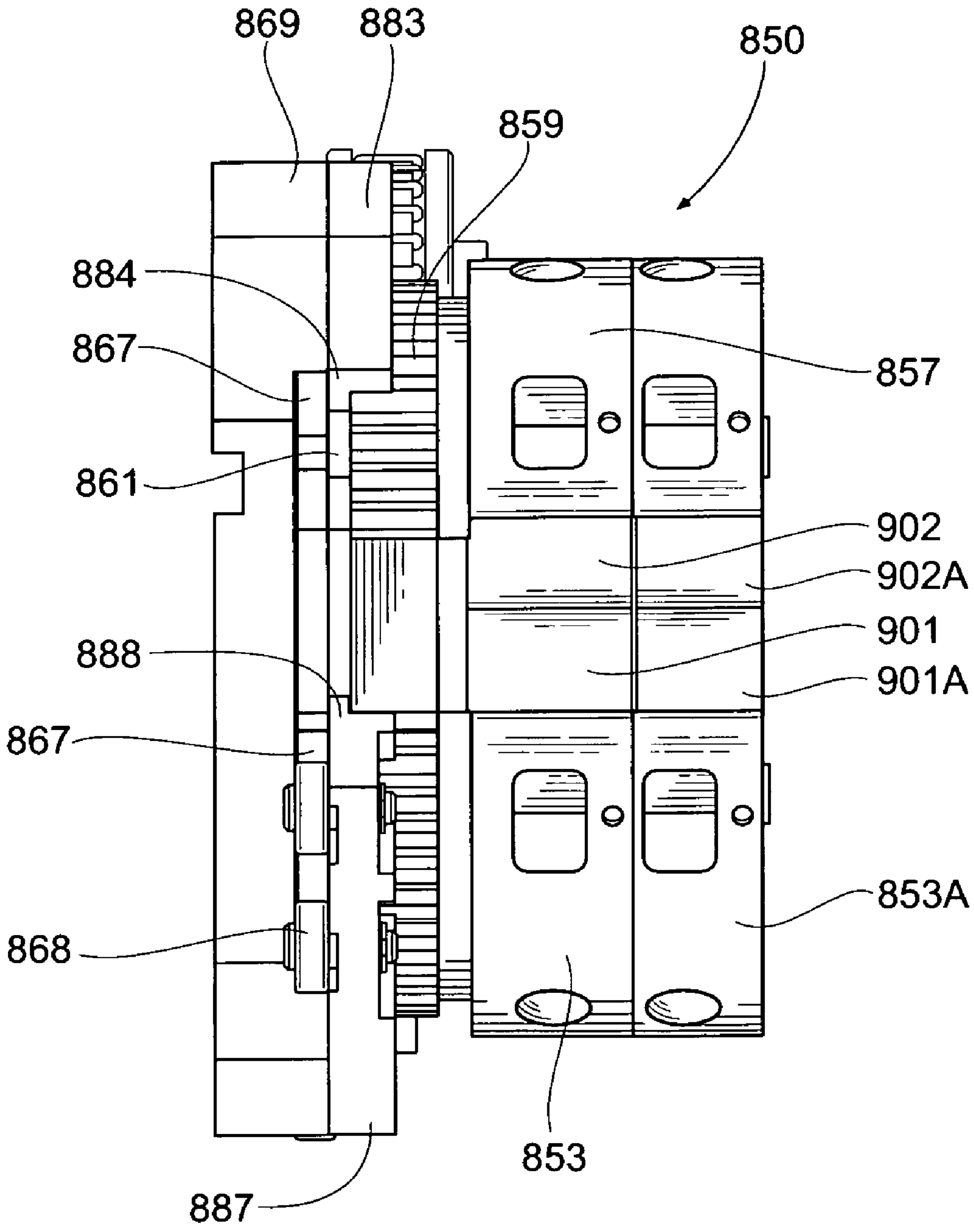
FIG. 14B is a side elevation view of the puck assembly shown in FIG. 14A.
Figure 15:
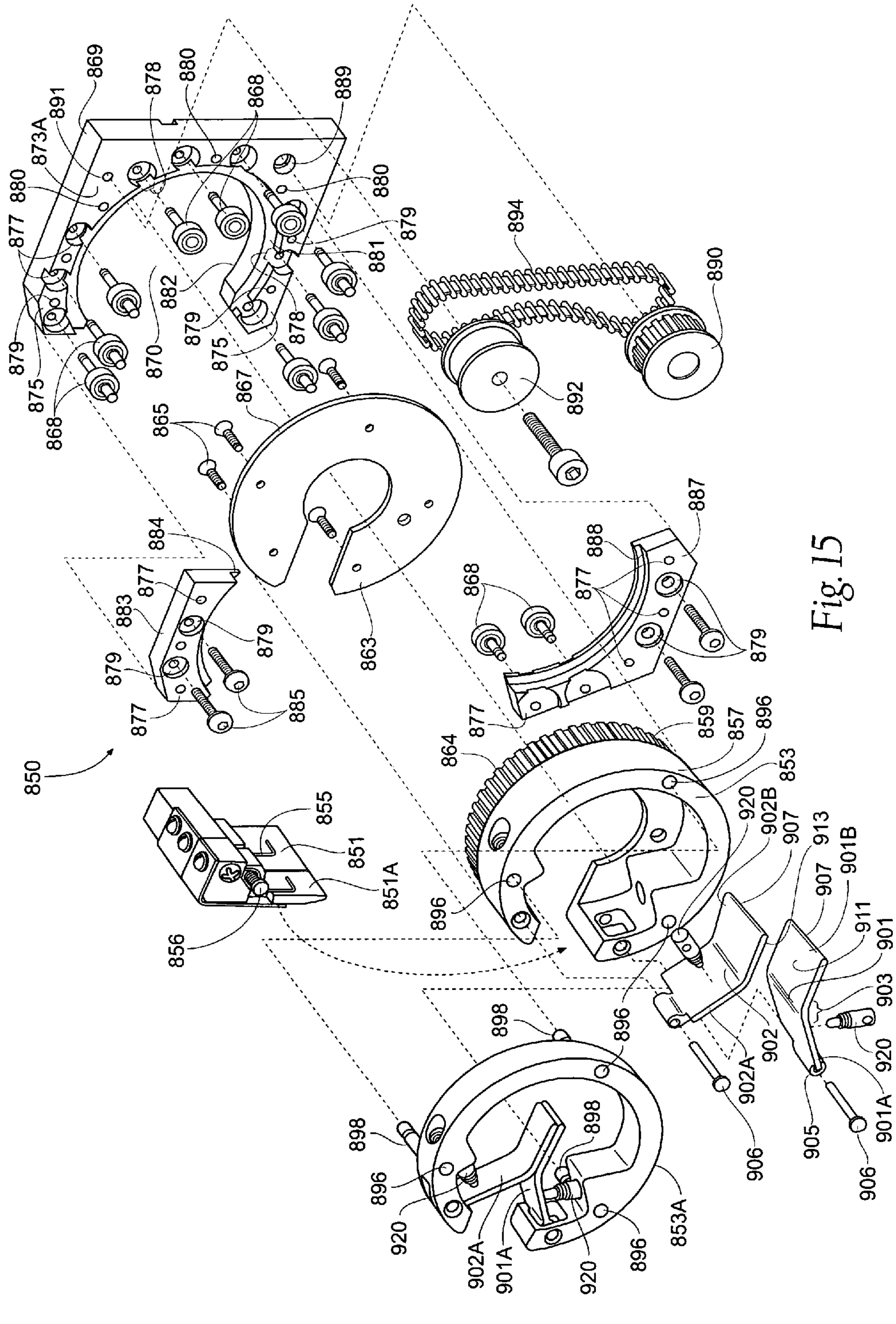
FIG. 15 is an exploded view of the puck member assembly of the label wrapper in FIG. 10.

As may be seen particularly in the exploded view of FIG. 15, the label wrapper 850 further includes a puck flange 863. The puck flange 863 is affixed to the puck element 853 on an outer surface 864, by way of screws 865 or other conventional manner. The puck flange 863 preferably includes a circumferential surface 867 in rotational contact with a plurality of circumferentially spaced roller bearings 868 located in a puck mount plate 869. The puck flange 863, when affixed to the puck element 853 on its outer surface 863 and in conjunction with the axially extending marginal support shelf 861, provides a circumferential trough 871 as seen in FIG. 14B.

As mentioned earlier and seen particularly in the view of FIG. 15, the label wrapper 850 further includes a puck mount plate 869. The puck mount plate 869 defines a relatively flat planar surface having a first side 873A, a second side 873B, and oppositely disposed arm portions 875. The oppositely disposed arm portions 875 define a generally c-shaped central aperture 870. The first side 873A of the puck mount plate further includes a plurality of bearing apertures 877, mount apertures 879, support apertures 880, and a coaxial countersunk groove 881. The bearing apertures 877 are each preferably arranged to receive a supporting roller bearing 868. The countersunk groove 881 is preferably coextensive with a marginal edge 882 of the generally c-shaped central aperture 870 and is interrupted to allow a portion of each bearing 868 to extend through a respective interruption 878 for rotational support of the circumferential surface 867 of the puck flange 863. The support apertures 880 are adapted to receive support bolts or screws (not shown) for supporting the puck plate 875 on a stationary supporting structure 10 (shown in FIG. 2). The countersunk groove 881 is preferably adapted to receive the outer circumferential surface 867 of the puck flange 863.

The label wrapper 850 further includes an upper puck guide member 883 having a radially inwardly extending curb surface 884, a plurality of bearing apertures 877, and a plurality of mount apertures 879 for receiving mounting bolts or screws 885 which are in turn received by corresponding mount apertures 879 in the puck mount plate 875. The radially inwardly extending curb surface 884 is preferably received in the aforementioned circumferential trough 871.

The wrapper assembly 850 further includes a lower puck guide member 887. The lower puck guide member 887, similarly to the upper puck guide member 883, includes an arcuate, coaxial, radially extending curb surface 888, a plurality of bearing apertures 877 for receiving additional roller bearings 868, and a plurality of mount apertures 879. The arcuate, coaxial radially extending curb 888 of the lower puck guide 887 is preferably arranged to be received in the circumferential trough 871 formed by the puck flange 863 and support shelf 861 of puck member 853 (see particularly FIG. 14B).

As seen in FIGS. 14A-15, inclusive, the puck mount plate 869 includes at least one aperture 889 for supporting a drive sprocket 890, and further includes an aperture 891 for supporting an idler pulley 892. The drive sprocket 890 and the idler pulley 892 being spaced and arranged to support a preferably notched drive belt 894. The notched surface 894A of the drive belt 894 is adapted to engage the toothed marginal edge 859 of the puck member 853. The relationship of the components will be hereinafter discussed.

As seen particularly in the exploded view of FIG. 15, the puck member 853 is further provided with a pair of complementary, pivotally mounted, wing members 901,902. It is generally desirable to have wing members 901,902 of similar shape. Therefore, for ease of description, only one wing member 901 will be discussed. A wing member 901 preferably has a general configuration defining two oppositely disposed arm members 901A,901B defining an obtuse angle 903 therebetween. One arm member 901A includes an end 905, which is pivotally mounted at its extremity to the puck member 853 by means of a pivot pin 906. The other arm member 901B preferably includes an opposite end 907 extending inwardly of a cavity 854 in the puck member 853 and having an obverse side 911 in contact with a complementary side 913 of the second wing member 902. Each wing member 901,902 is preferably normally biased toward the other 902,901 by means of a respective spring loaded pin 920 bearing on the respective pivoted arms 901A,902A. In this way, when an elongate object 100 is introduced past the door 851 and into the cavity 854 of the puck member 853, the inward pressure of an outer surface 145 of the elongate object 100 causes the wings 901,902 to separate relative to one another and thereby allow the elongate object 100 to be held between the normally contacting wing arms 901B,902B. While the elongate object 100 is held in this position, rotational movement of the puck element 853 causes a label 505 to be secured around the elongate object 100. The spring loaded pins 920 provide wing pressure to the respective wing member 901,902. It is preferable that this wing pressure is adjustable. That is, the force applied to the wing members 901,902 by the spring loaded pins 920 may be varied, depending upon the object 100 to be wrapped. If the object 100 is a relatively flexible, maybe even collapsible tube structure, the wing pressure may need to be reduced to avoid deformation of the object 100. On the other hand, if the object 100 is a solid elongate member, the wing pressure may be increased to ensure lasting placement of a label 505 by the applicator 8. While the drawings show pivoted wing members 901,902 including pivot pins 906, and spring loaded pin 920, it is to be understood that the present invention may be practiced using wing members 901,902 having an inherent bias toward one another and being rigidly suspended from the puck member 853 (not shown).

The c-shaped puck member 853 is preferably expandable, as can be seen in FIG. 15 by the incorporation of a second c-shaped puck member 853A. While various methods exist for mechanically coupling two members, the first c-shaped puck member 853 is preferably provided with a plurality of apertures 896, which contain spring loaded ball detent retainers (not shown). The ball detent retainers (not shown), in turn, frictionally couple with a plurality of notched standards 898, which are attached to the second c-shaped puck member 853A in a mating position to the apertures 896 in the first c-shaped puck member 853. While similar to the first c-shaped puck element 853, the second c-shaped puck element 853A is preferably provided without a toothed marginal edge 859, like the first 853. The lack of such edge 859 on the second puck 853A allows the second puck 853A to mate closely with the first puck 853.

Figure 16:
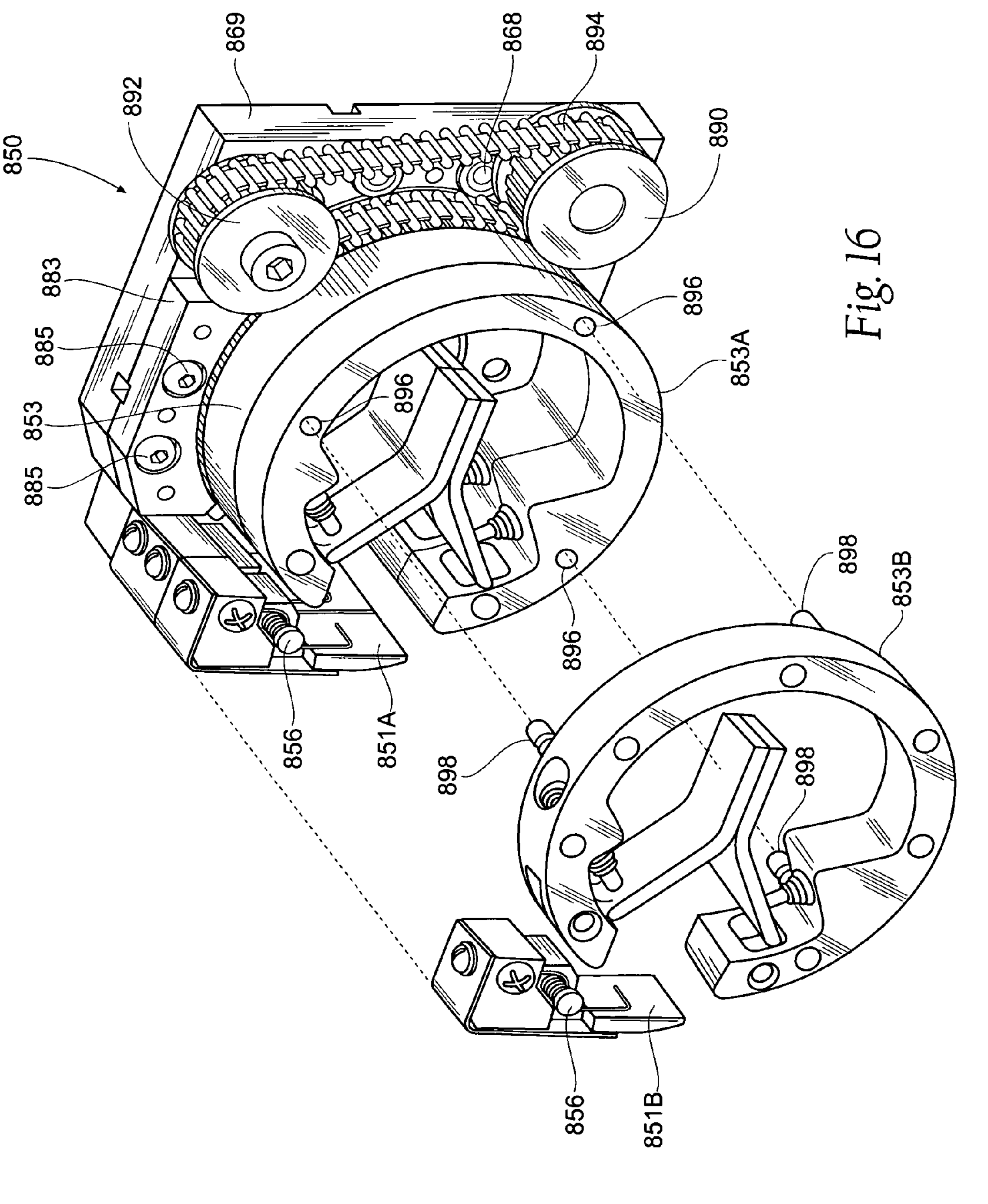
FIG. 16 is an exploded view of the label wrapper of FIG. 10, including additional sections.

Illustrating subsequent expandability of the wrapper assembly 850, FIG. 16 shows the expandable wrapper assembly 850, further including a third c-shaped puck element 853B and third entrance door 851B.

Controller

The apparatus may further comprise a controller 2. As shown in FIG. 2, the controller 2 preferably comprises a printed circuit board 201, on which various electrical control components are placed, such as a microprocessor 203, associated memory 205, communications transceivers 207, and selectively engageable electrical connectors 209. Electrical outputs 211 from the controller 201 include those connections required to control the drive subsystem 3, the print station 7, and the applicator 8. Electrical power may be supplied to the circuitry by any conventional fashion.

Figure 17:
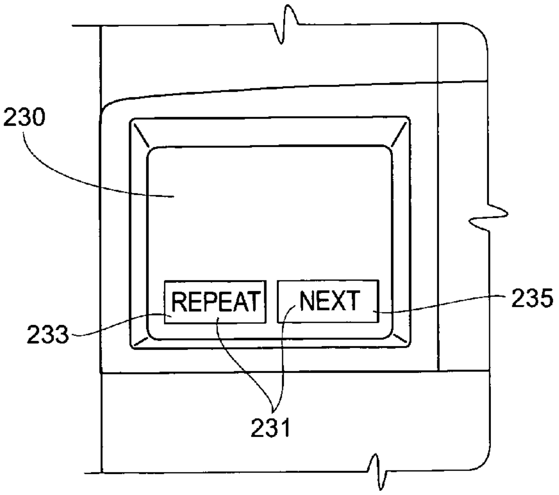
FIG. 17 is a perspective view of a user display screen.
Figure 18A:
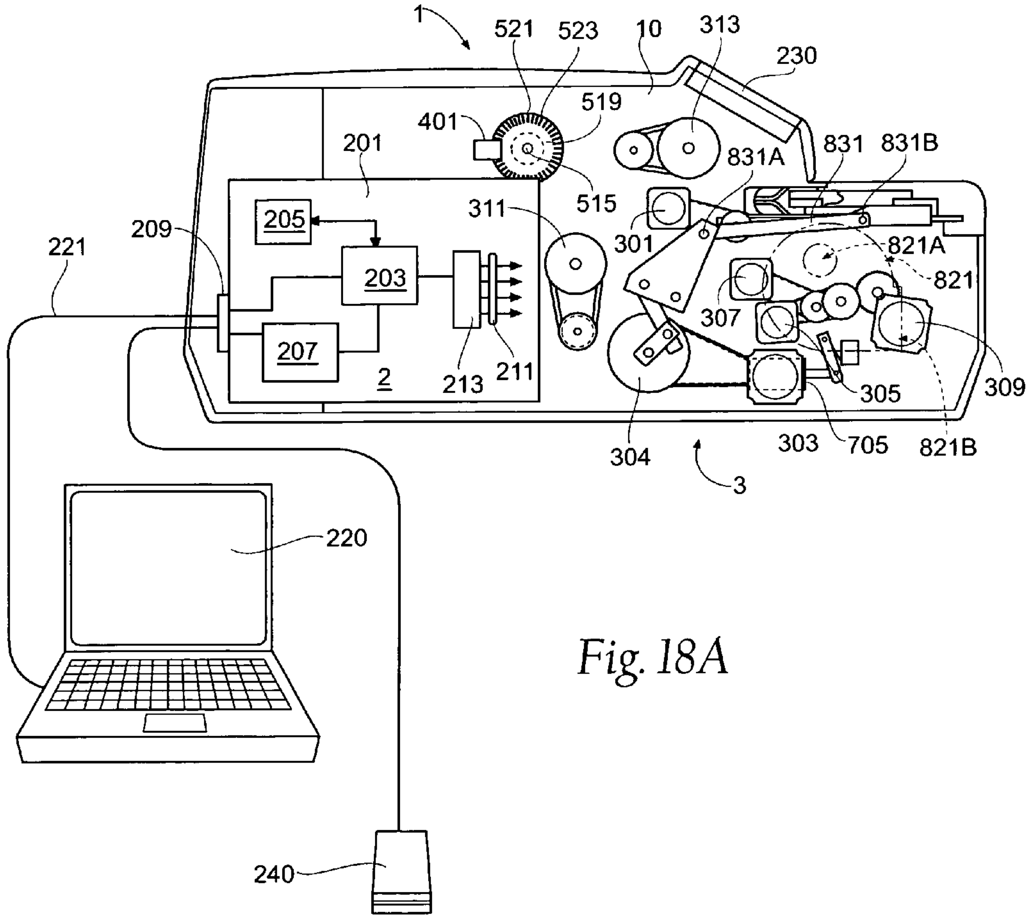
FIG. 18A is a first diagrammatic representation showing the apparatus of FIG. 1 coupled to another electrical device.
Figure 18B:
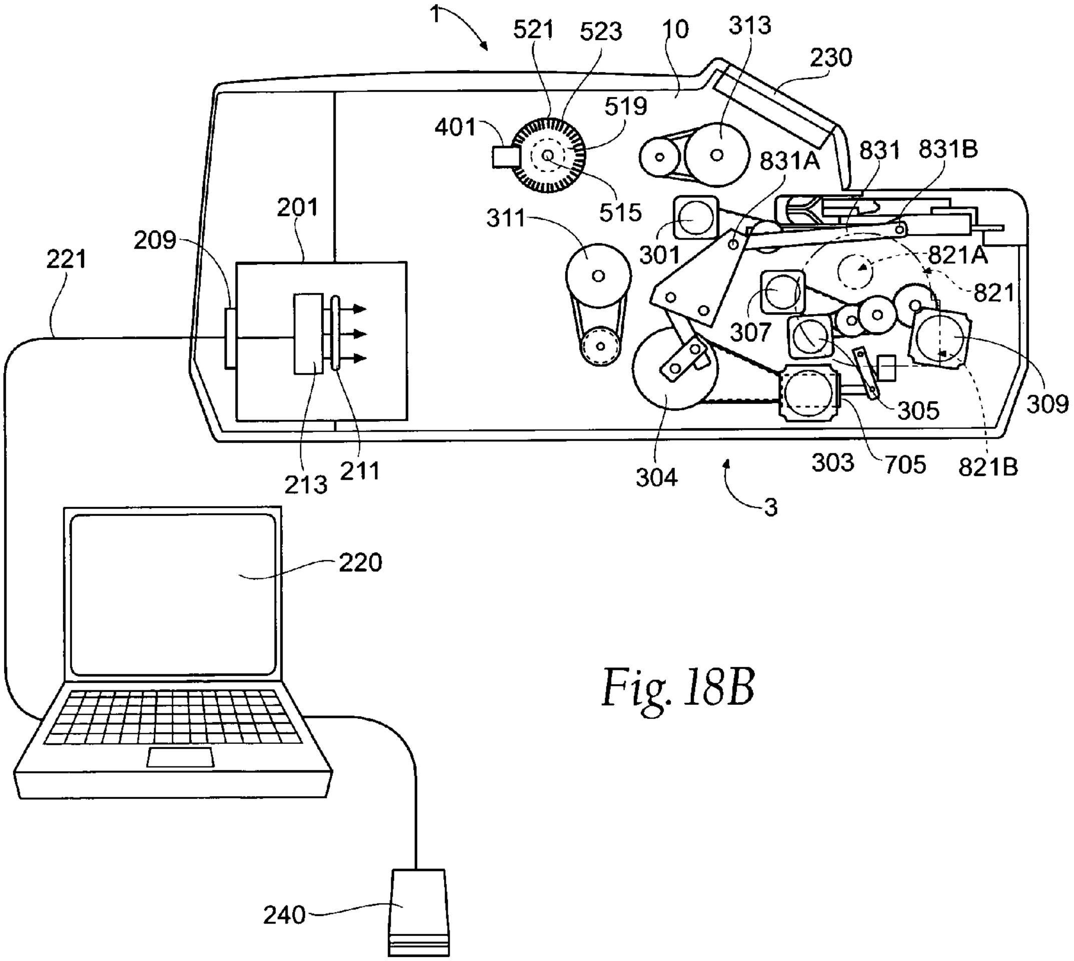
FIG. 18B is a second diagrammatic representation showing the apparatus of FIG. 1 coupled to another electrical device.

Generally, the controller 2 provides synchronization of the apparatus 1 by timing a plurality of electrical outputs 211 coupled to the drive subsystem 3, the print station 7, and the applicator 8. The electrical outputs 211 may be driven directly by the controller microprocessor 203, or alternatively by reactive components 213. The reactive components 213 generally respond to control signals and drive the outputs 211 accordingly. The outputs 211 provide control signals to the drive motor 301, the gripper arm motor 303, the platen motor 305, the label conveyor motor 307, the label peel motor 309, the backing take-up motor 311, the ribbon take-up motor 313, the print head 701, and the vacuum 821. The controller 2 may further be coupled to a user interface display 230. The display 230 is preferably a pressure sensitive touch screen whereby a user of the apparatus 1 may control various parameters, such as input and selection of desired label indicia. The display 230 also preferably provides a means to control the start of a label application cycle, such as software implemented buttons 231, as shown in FIG. 17.

Figure 20A:
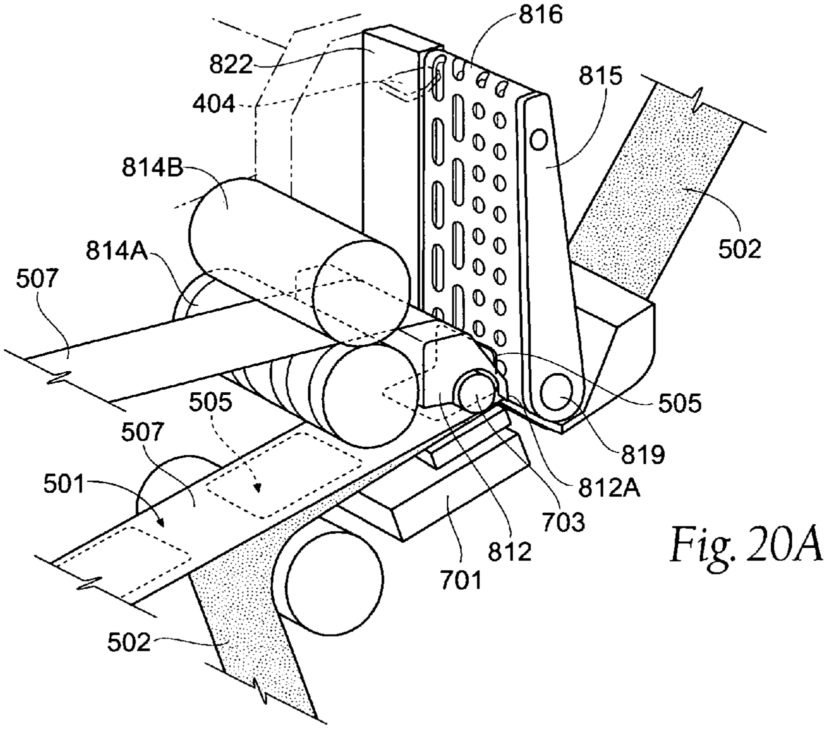
FIG. 20A is a perspective view of the label peeler assembly and print head shown in FIG. 4 with label media in a first position.
Figure 20B:
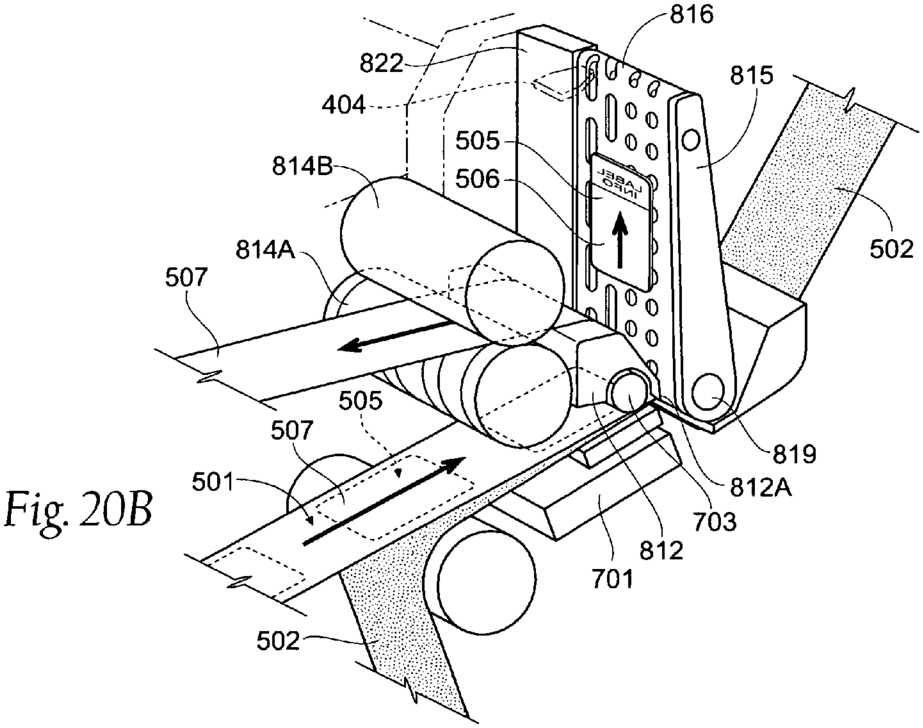
FIG. 20B is a perspective view of the label peeler assembly and print head shown in FIG. 4 with label media in a second position.

The controller 2 as shown is incorporated into the apparatus 1. However, the incorporated controller 2 could be a slave or master controller. As heretofore described, the controller 2 was a master controller. That is, when the controller 2 is the master controller, synchronization of the apparatus 1 is achieved by the controller 2. With reference to FIGS. 20A and 20B, the apparatus 1 is shown as being coupled to an off-board device 220, such as a personal computer. The off-board device 220 is coupled to the apparatus 1 preferably by wires 221 and electrical connectors 209. Alternatively, the coupling could be achieved with any other methods well known in the art for transmitting and receiving control signals.

FIG. 20A depicts an on-board controller 2 similar to that of FIG. 2. In this embodiment, the controller 2 may serve as either a master or a slave. As a master, the controller 2 may request certain data or label files from the off-board device 220, which would be acting as a slave. In this manner, the controller 2 would still provide synchronization of the apparatus.

Rather than act as a master, the controller 2 may be a slave. As a slave, the controller 2 would receive instructions from the off-board device 220, which would be acting as master. The off-board device 220, then, would provide synchronization to the apparatus 1 by ultimately controlling the controller outputs 211.

Rather than have the controller 2 and the off-board device 220 have dedicated master or slave functionality, a combination of master/slave modes could be utilized. Contemplated is an operation mode that would allow the off-board device 220 to act as master while uploading data to the controller memory 205. The off-board device 220 could then indicate to the controller microprocessor 203 that the data upload is complete. Upon receiving such indication, the controller 2 could resume master functionality and synchronization.

As shown in FIG. 20B, rather than incorporate master ability into the controller 2, the apparatus 1 may simply provide accessible electrical connections 209, coupled through a relatively passive printed circuit board 201, which would enable an off-board device 220 to provide the desired synchronization and cycle timing. The terms relatively passive merely indicate that the printed circuit board 201 may have reactive components 213 that respond to control signals from the off-board device 220. Such passivity may be achieved by using simple electrical connections such as copper traces provided on the printed circuit board 201, or components such as switches, relays, or signal drivers that react to the control signals from the off-board device.

Also preferably attached to the controller 2 is a cycle actuator 240. Although, as mentioned above, the display screen 230 may provide a means for starting a label application cycle, a separate cycle actuator 240 is preferred. The actuator 240 preferably comprises a foot pedal that is coupled to the controller 2, and preferably the master controller, whether it is the on-board controller 2 or an off-board device 220, as shown in FIG. 20B.

Feedback Subsystem

Figure 19A:
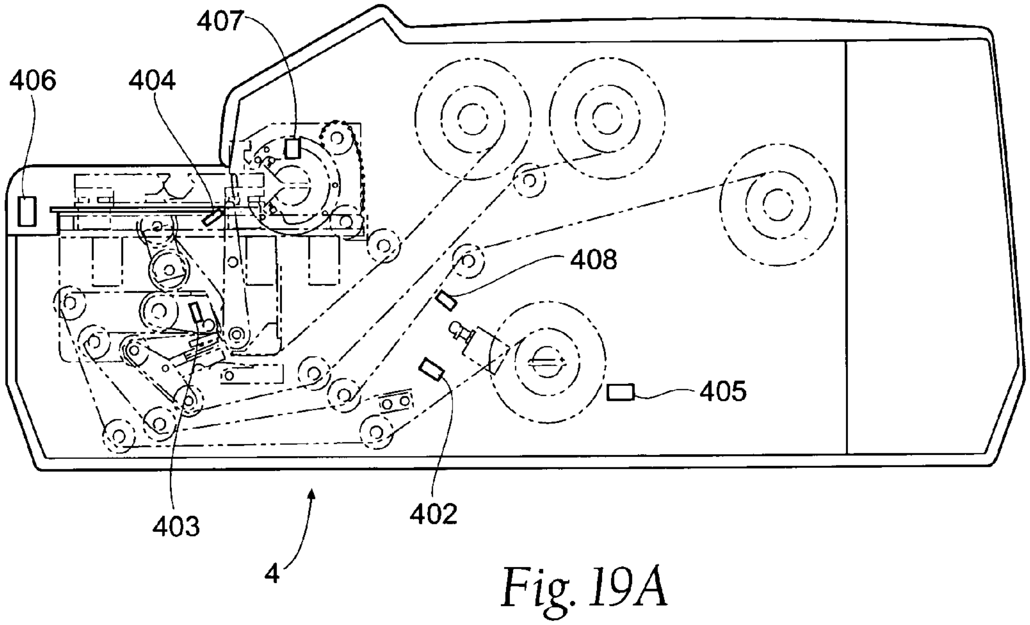
FIG. 19A is a left elevation view of sensors used in a feedback subsystem according to an embodiment of the present invention.
Figure 19B:
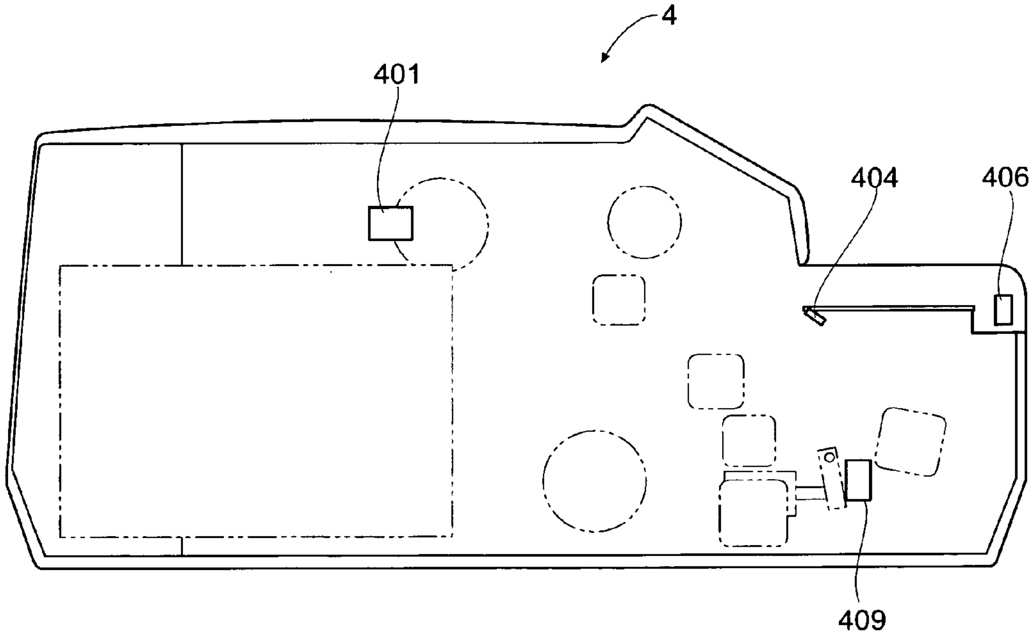
FIG. 19B is a right elevation view of sensors used in a feedback subsystem according to an embodiment of the present invention.

A feedback subsystem 4 may provide feedback parameters to the controller 2. As shown in FIGS. 19A and 19B, the feedback subsystem 4 is preferably comprised of a plurality of sensors. FIG. 19A is a left elevation view of an embodiment according to the present invention depicting an image transfer supply sensor 401. The image transfer supply sensor 401 cooperates with the indexing disc 519, which is coupled to the image transfer ribbon supply shaft 515. The sensor 401 provides positioning information of the ribbon supply spool 513 to the controller 2, thereby allowing the controller 2 to more accurately control the ribbon take-up motor 313. Preferably, the sensor 401 is a photoelectric sensor that detects position indicative markings or slots 521 on the indexing disc 519.

FIG. 19B is a right elevation view of an embodiment according to the present invention depicting several sensors for use in the feedback subsystem 4. In addition to the image transfer supply sensor 401, the feedback subsystem 4 preferably comprises other sensors: a label size sensor 402, a print sensor 403, a wrap sensor 404, a backing full sensor 405, a gripper home sensor 406, a puck position sensor 407, a label supply sensor 408, and a solenoid sensor 409. Generally, the label size sensor 402 detects the size of a label 505 to be printed; the print sensor 403 detects the presence of a label 505 in a proper printing position in the print station 7; the wrap sensor 404 detects the presence of a label 505 in a proper position to commence wrapping of the label 505 around an elongate object 100; the backing full sensor 405 detects a predetermined amount of label backing material 507 placed on the backing take-up roll 509; the gripper home sensor 406 detects the position of the gripper elements 833 in an open position; and the puck position sensor 407 detects the rotational movement of the puck assembly 853.

To detect the size of a label 505 to be printed and applied, the label size sensor 402 is preferably sensitive to an ultraviolet ink applied to the label media 501. The label size sensor 402 preferably detects both the length and width of the label 505. The backing material 507 is preferably overprinted with a band of transparent ultraviolet (UV) ink, in order to define datum marks 508. The label size sensor 402 is arranged to detect the datum marks 508 between successive labels 505, so that the apparatus 1 can determine label 505 presence and spacing as well as incremental movement of the labels 505 through the apparatus 1, and alternatively, to determine where to print indicia on successive labels 505. In order to achieve this, the sensor 402 preferably comprises a light source (not shown), which illuminates the backing material 507 with UV light. UV light is reflected from the backing material 507 onto a UV sensor (not shown) disposed adjacent the light source. In use, a greater amount of UV light is reflected by the backing material 507 when the datum marks 506 pass the sensor 402. The sensor 402 detects the increased reflection, and information regarding label size is communicated to the controller 2. The controller 2 may use this information for any desirable purpose, but preferably, the information is used in control algorithms for the platen motor 305, the label peel motor 309, and the print head 701.

The print sensor 403 is preferably a proximity sensor that detects a label 505 located in the correct printing position proximate to the print head 701. Once detected, information regarding label print location is communicated to the controller 2. The controller 2 may use this information for any desirable purpose, but preferably, the information is used in control algorithms for the platen motor 305, the print head 701, and the print head solenoid 705.

The wrap sensor 404 is preferably a proximity sensor that detects a label 505 located in the correct wrapping position while on the label conveyor 815. Once detected, information regarding label wrap location is communicated to the controller 2. The controller 2 may use this information for any desirable purpose, but preferably, the information is used to signal a ready condition to a user of the apparatus 1.

The backing full sensor 405 is preferably a proximity sensor that detects a predetermined amount of label backing material 507 placed on the backing take-up roll 509. Once detected, information regarding the amount of backing material 507 is communicated to the controller 2. The controller 2 may use this information for any desirable purpose, but preferably, the information is used to provide an indication to a user of the apparatus 1 that the backing take-up roll 509 is full and must be emptied.

The gripper home sensor 406 is preferably a proximity sensor that detects the position of the gripper elements 833 in an open position. Once detected, information regarding the position of the gripper elements 833 is communicated to the controller 2. The controller 2 may use this information for any desirable purpose, but preferably, the information is used in control algorithms for the platen motor 305, the label peel motor 309, the backing take-up motor 311 and the ribbon take-up motor 313.

The puck position sensor 407 is preferably a proximity sensor that detects the rotational movement of the puck assembly 853 by sensing the interrupted circumferential surface 803 of the rotating puck 853. Once detected, information regarding the position of the puck element 853 is communicated to the controller 2. The controller 2 may use this information for any desirable purpose, but preferably, the information is used in control algorithms for the drive motor 301.

The label supply sensor 408 is preferably a proximity sensor that detects the presence of label media 501. Once detected, information regarding the presence of label media 501 is communicated to the controller 2. The controller 2 may use this information for any desirable purpose, but preferably, the information is used in control algorithms for the drive subsystem 3, the material subsystem 5, the print station 7, and the applicator 8.

The solenoid sensor 409 is preferably a limit switch that detects the engagement of the print head 701 towards the platen roller 703 by the print head solenoid 705. Once detected, information regarding the presence of label media 501 is communicated to the controller 2. The controller 2 may use this information for any desirable purpose, but preferably, the information is used in control algorithms for the print head 701, the platen roller 703, the label peeler 811, and the material subsystem 5.

Apparatus Operation

The operation of the present apparatus 1 will be next described in connection with FIGS. 2, 3, and 20A-20N, inclusive. Generally, the apparatus 1 is used to wrap a label 505 around an elongate object 100. More particularly, the apparatus may print a label 505, separate the label 505 from a backing material 507, cause the label 505 and elongate object 100 to converge, and wrap the label 505 around the elongate object 100.

Prior to placement into the apparatus 1, the labels 505 may be conjoined by way of a releasable liner material 507, thereby forming the label media 501. When the labels 505 are conjoined in this way, they may be spooled on a label roller assembly 503 (see FIG. 3) for facile dispensation throughout the apparatus 1. As seen in FIG. 3, the label media 501 may be manually threaded through the apparatus 1 prior to commencement of the labeling process. The labels 505 and releasable liner material 507 are positioned in the apparatus 1 such that they are guided by rollers 106 past the label supply sensor 408, a tensioner arm 110, and the label peeler assembly 811. Thereafter, the liner material 507, having been stripped of the labels 505 by the label peeler assembly 811, continues through the peel roller nip 814C and back to the backing take-up roll 509.

After label media 501 and image transfer media 502 have been properly loaded into the apparatus 1, a wrapping cycle may begin. To begin a cycle, desired label indicia to be printed onto the label media 501 are communicated to the print head 701, and the media 501 is placed in proper printing position between the print head 701 and the platen roller 703. Verification of proper media 501 placement is communicated to the controller 2 by the label print sensor 403. Upon communication of proper placement, the controller 2 activates the print head solenoid 705 to provide rotational movement to the print head 701 via the cammed shaft 707. While the cammed shaft 707 is engaged with the print head 701, the print head 701 prints the communicated label indicia onto the label 505. After printing is complete, the pressure from the cammed shaft 707 is released by deactivating the print head solenoid 705. Such deactivation allows the label media 501 and the image transfer media 502 to travel freely and at different rates. The label media 501 is pulled across the label peeler 811 by the label peeler roller set 814 and the image transfer media 502 is advanced only as far as necessary by the ribbon take-up spool 517.

Figure 20C:
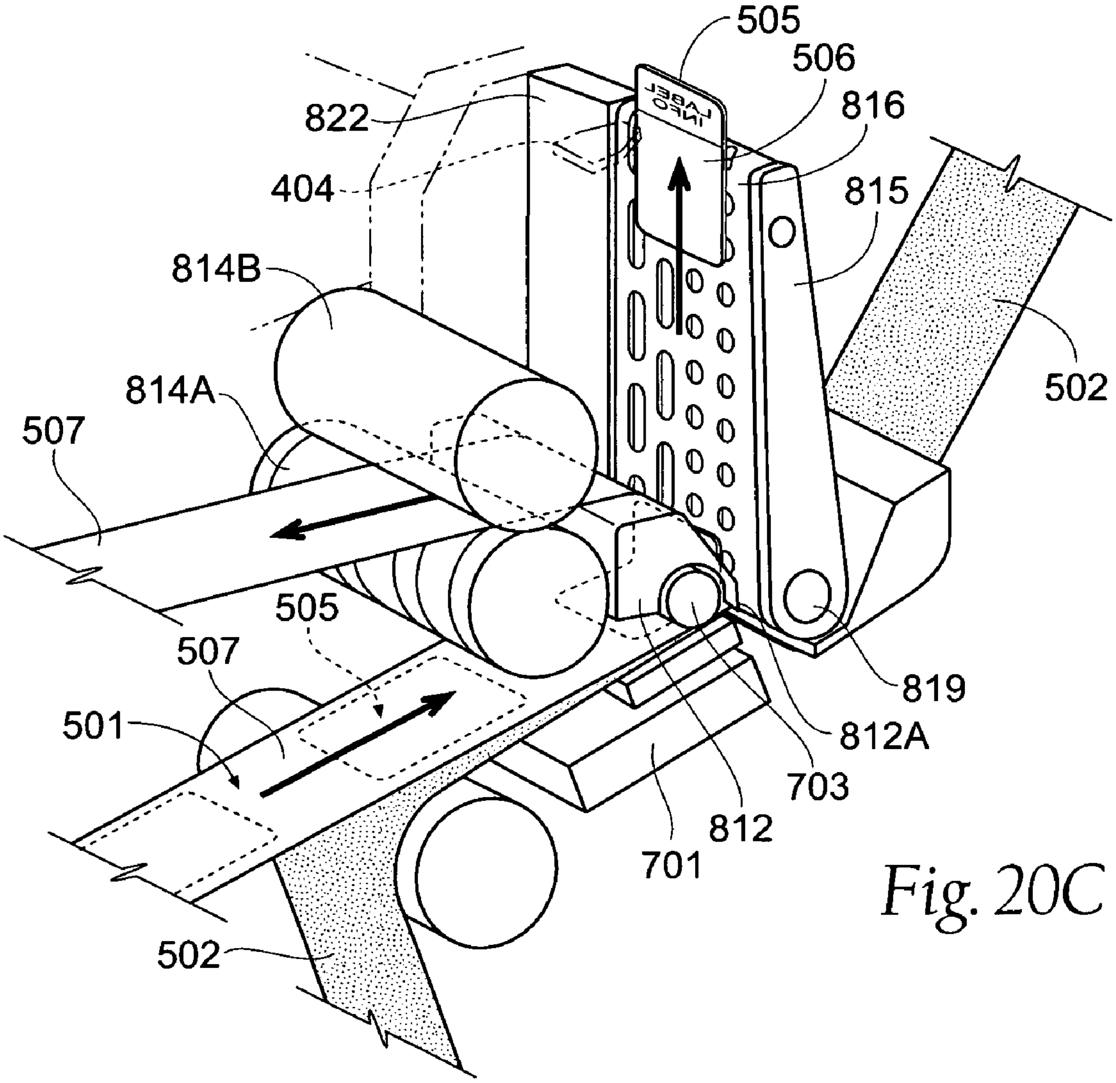
FIG. 20C is a perspective view of the label peeler assembly and print head shown in FIG. 4 with label media in a third position.

Referring particularly to FIGS. 20A-C, inclusive, transfer of a label 505 from the label backing material 507 to a placement position can be seen. The labels 505 and backing material 507 are moved toward a label removal device, such as the label peeler assembly 811, by way of the peel roller set 814. The label peeler assembly 811 includes a label peel plate 812 having an edge 812A over which the label media 501 passes. The edge 812A facilitates peeling an edge of the passing label 505 from the backing material 507 to expose an adhesive surface 506 for initial contact with an elongate object 100 (not seen in these views) prior to entry into the cavity 854 of the puck element 853. The peeled label 505 is then picked up by the label conveyor 815 and remains on the perforated belt 816 by way of a vacuum pressure through the perforated belt apertures 818 generated by the vacuum 821 through the plenum 822 and the vacuum plate 820. The label 505 is then conveyed to a proper placement position. Proper positioning of the label 505 is determined by the label wrap sensor 404.

Figure 20D:
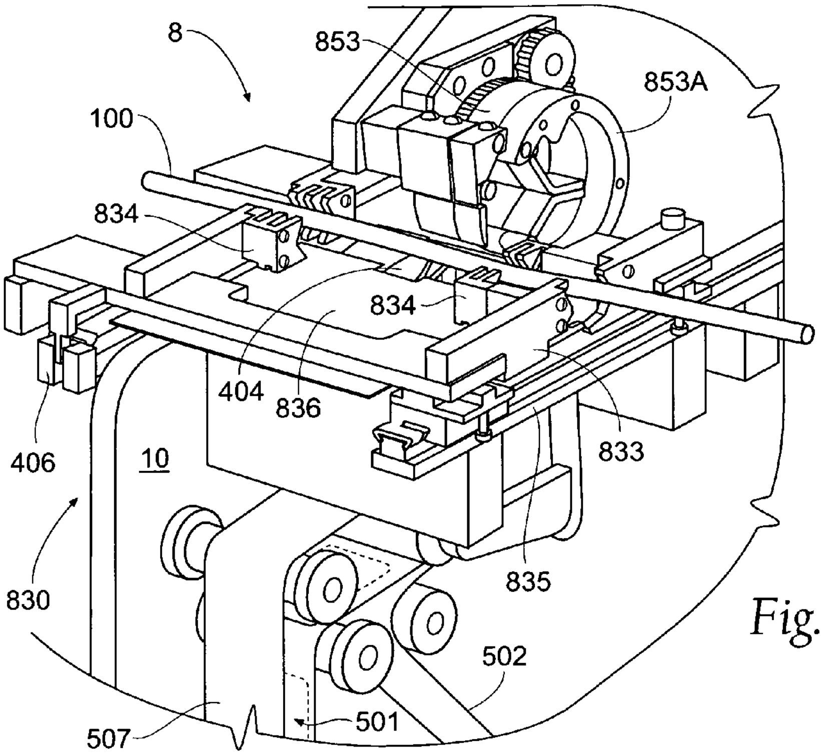
FIG. 20D is a perspective view of an embodiment of a label applicator according to the present invention and showing an elongate object in place in open gripper arms and ready to be inserted into the puck member.

As seen in FIG. 20D, an elongate object 100 is placed in the spaced apart open jaw members 834 of the gripper assembly 830 prior to movement of the jaws 834.

Figure 20E:
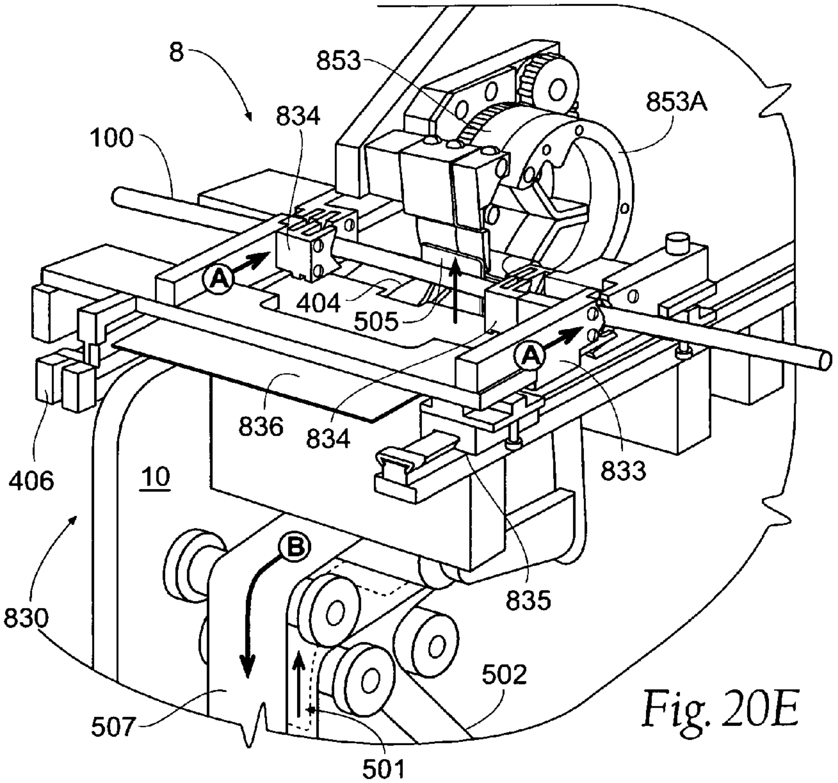
FIG. 20E is a perspective view similar to that of FIG. 20D, but showing gripper arms closed around the elongate object and moving toward a presented label.

FIG. 20E illustrates the jaws 834 closed about an elongate object 100 and moved inwardly in the direction of arrows A. A label 505 with an exposed adhesive portion 506, after having been prepared as in FIGS. 20A-C, is presented and ready for contact with the outer surface 145 of an elongate object 100. Further, spent liner material 507 is illustrated as being moved away from the applicator 8 and toward the take-up roll 509 (see FIG. 3) in the direction of arrow B.

Figure 20F:
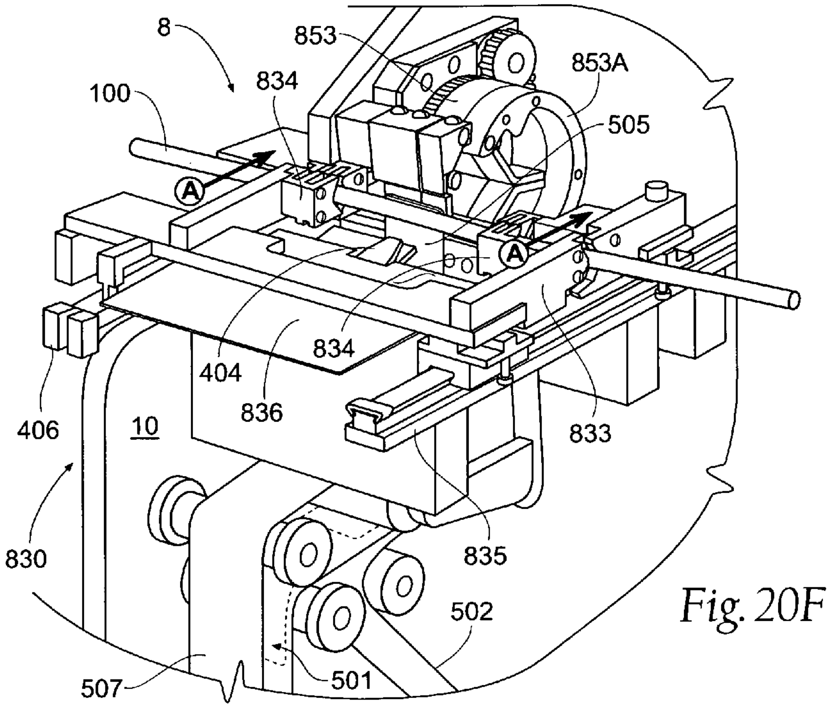
FIG. 20F is a perspective view similar to those of FIGS. 20D and 20E, but showing an elongate article engaging an adhesive surface of a presented label.

As seen in FIG. 20F, the gripper elements 833, jaw members 834 and the elongate object 100 further travel in the direction of arrows A and toward an outer face 858 of the entrance door 851. This movement further engages the exposed adhesive surface of the label 505 with the outer surface 145 of the elongate object 100.

Figure 20G:
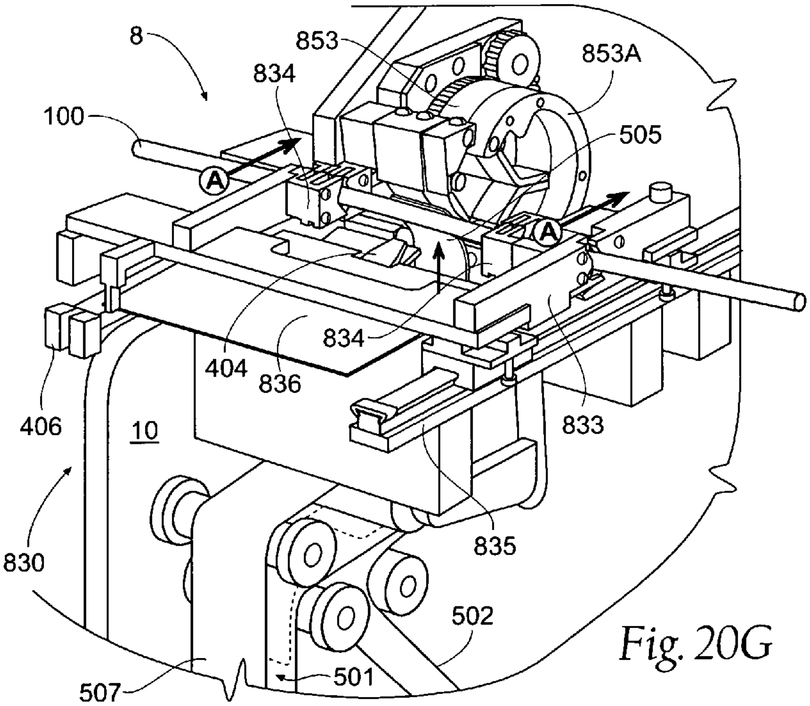
FIG. 20G is a perspective view similar to those of FIGS. 20D-F, inclusive, but showing the gripper arms pushing the elongate object and engaged label against the puck door and toward the puck cavity.
Figure 20H:
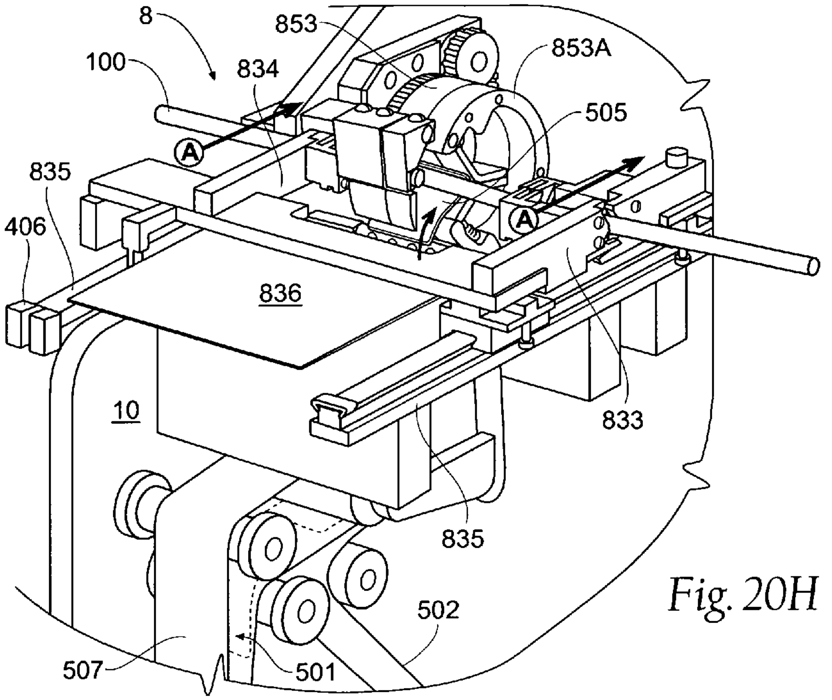
FIG. 20H is a perspective view similar to those of FIGS. 20D-G, inclusive, but showing the gripper arms pushing the elongate object and engaged label into the puck cavity.
Figure 20I:
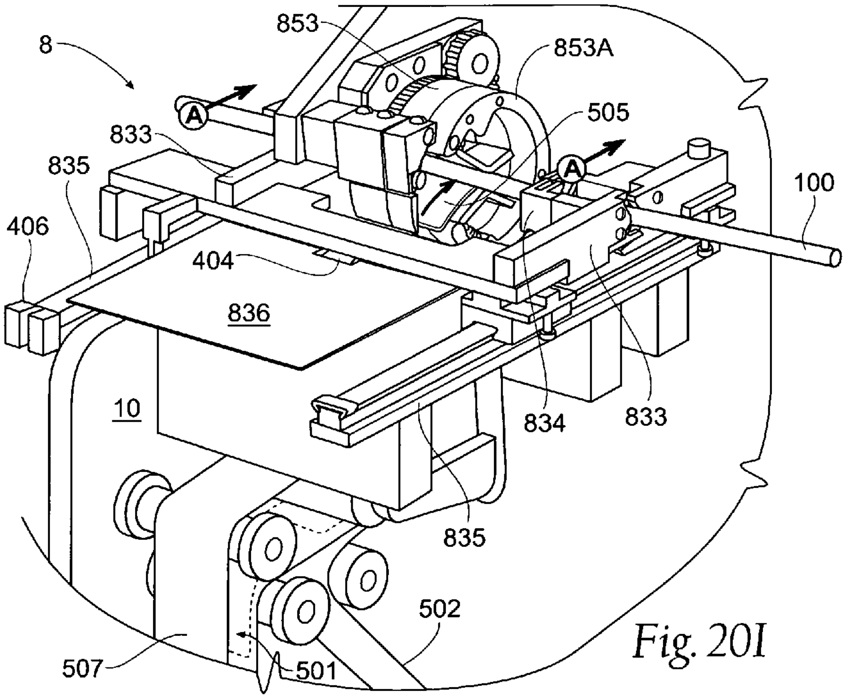
FIG. 20I is a perspective view similar to those of FIGS. 20D-H, inclusive, but showing the elongate object and engaged label in the puck cavity and slightly parting opposing wing members.
Figure 20J:
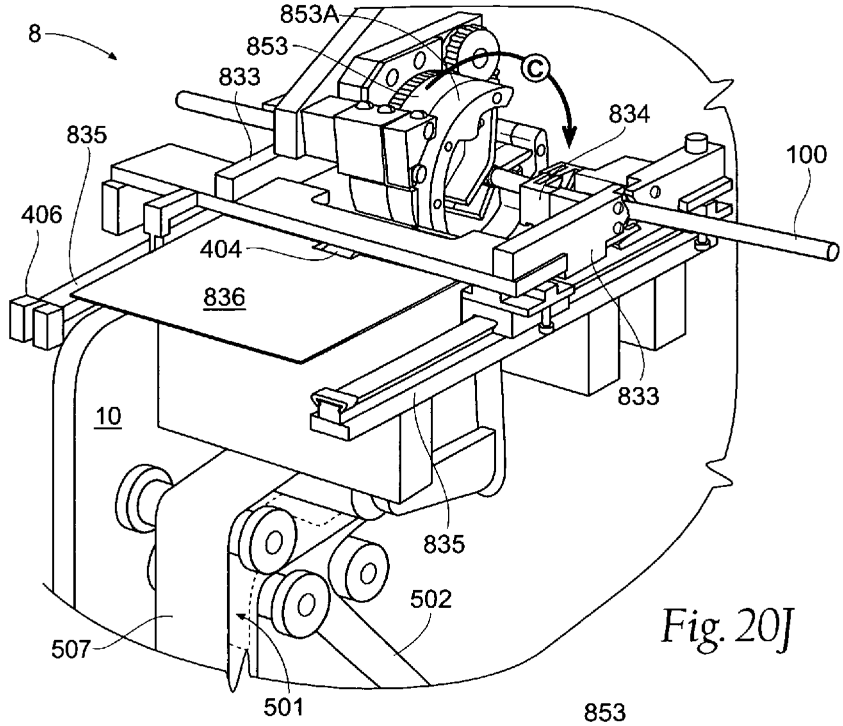
FIG. 20J is a perspective view similar to those of FIGS. 20D-I, inclusive, but showing the elongate object and engaged label in the puck cavity and the puck rotating thereabout thereby securing the label around the elongate object.

As further seen in FIG. 20G, the elongate object 100 and partially adhered label 505 are further moved in the direction of arrows A and pushed against the outer face 858 of the door 851. As seen, this movement partially opens the door 851 into the cavity 854 (not seen in this view) of the puck member 853. The apparatus 1 is adapted to allow for varying dwell times of the elongate object 100 against the outer face 858 of the door 851, thereby allowing greater or lesser adhesive surface portions to be engaged prior to puck rotation. FIG. 20H depicts the elongate object 100 and partially attached label 505 further moved in the direction of arrow A into the cavity 854 of the puck member 853 and against the biased wing members 901,902 in readiment for rotational movement of the puck member 853. FIG. 20I illustrates the elongate object 100 and partially attached label 505 further moved in the direction of arrows A into the cavity 854 of the puck member 853 and slightly parting the biased wing members 901,902. FIG. 20J illustrates the puck member 853 rotating in the direction of arrow C, thereby securing the label 505 around the elongate object 100. The puck member 853 rotates at a predetermined speed for a predetermined number of revolutions, which depend on the type and size of elongate article 100 and label 505 to be utilized.

Figure 20K:
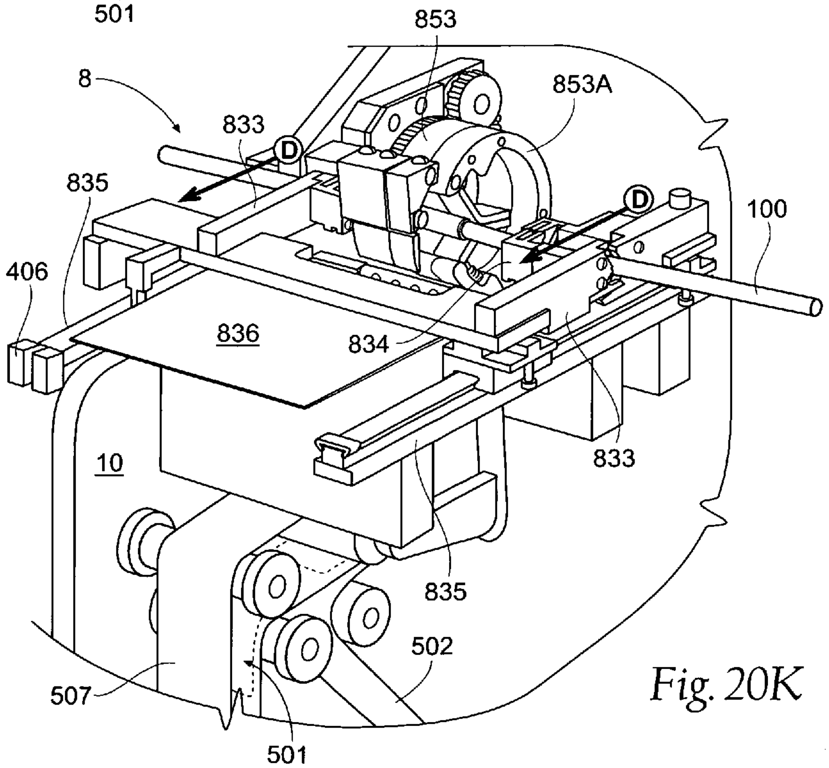
FIG. 20K is a perspective view similar to those of FIGS. 20D-J, inclusive, but showing the puck member in finished position with a label wrapped around an elongate object.
Figure 20L:
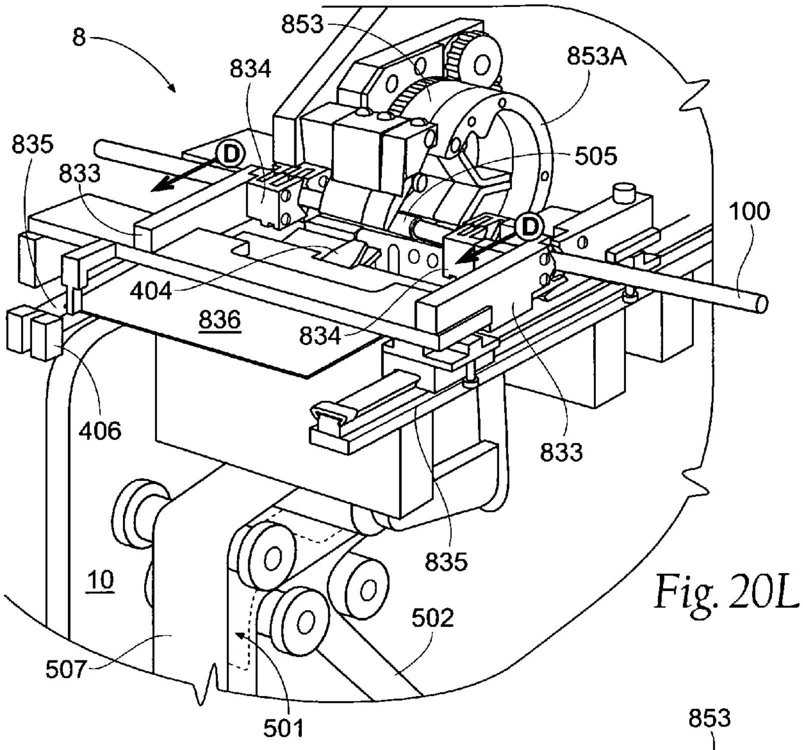
FIG. 20L is a perspective view similar to those of FIGS. 20D-K, inclusive, but showing the gripper arms moving an elongate object with wrapped label from the puck cavity and past the puck door.
Figure 20M:
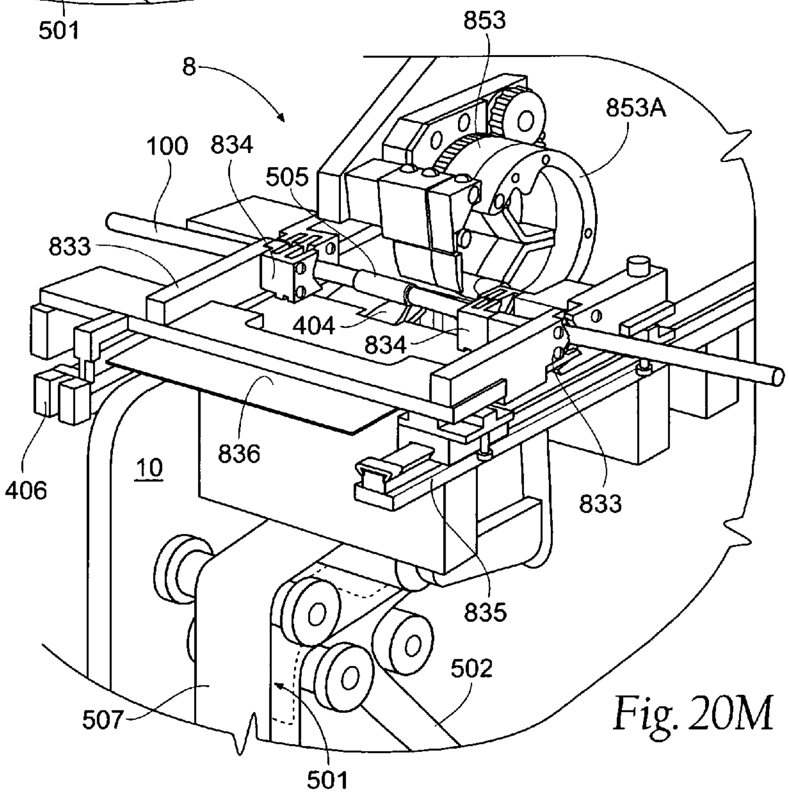
FIG. 20M is a perspective view similar to those of FIGS. 20D-L, inclusive, but showing the finished, wrapped elongate object removed from the puck cavity.
Figure 20N:
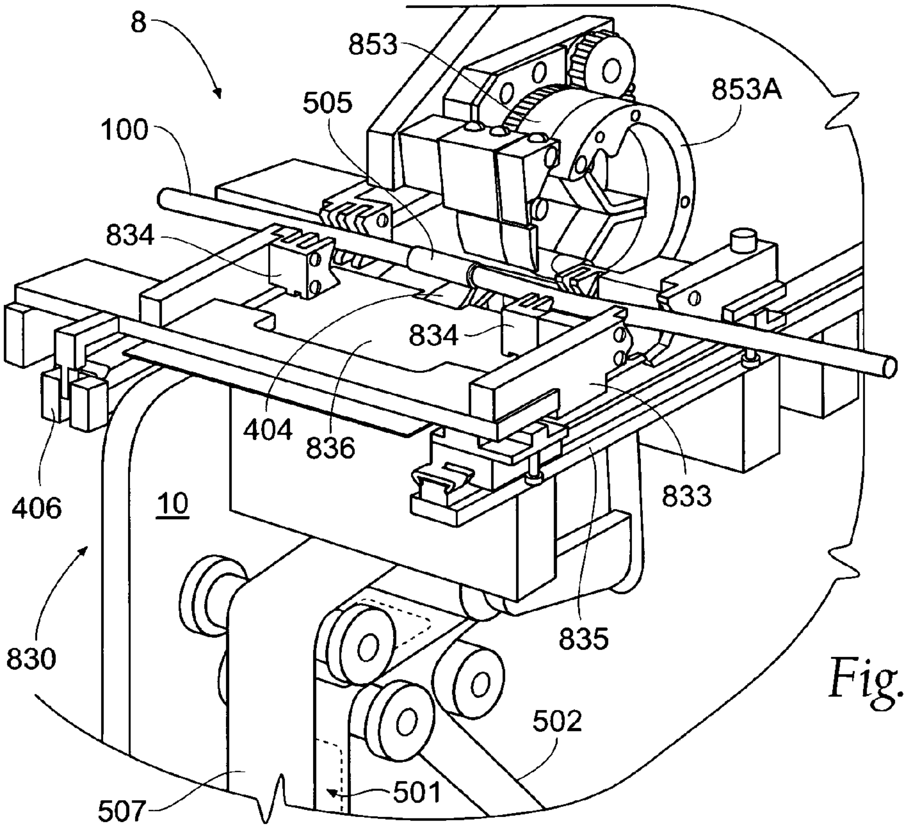
FIG. 20N is a perspective view similar to those of FIGS. 20D-M, inclusive, but showing the gripper arms in open position to release the finished, wrapped elongate object.

As seen in FIG. 20K, and after completion of a predetermined revolution cycle, the puck element 853 returns to a finished position, and the elongate article 100, gripper elements 833, and jaw members 834 begin a retracting movement in the direction of arrows D. The label 505 may be seen as fully secured about the elongate object 100 while remaining in the puck cavity 854. FIG. 20L illustrates the gripper elements 833, jaw members 834, and elongate article 100 with label 505 attached, moving in the direction of arrows D. This movement pushes the elongate object 100 against the inner face 860 of door 851, thereby opening the door 851 for removal of the object 100 and attached label 505 from the puck cavity 854, as seen in FIG. 20M. FIG. 20N shows the elongate article 100 with label 505 applied thereabout, and jaw members 834 in the open position for removal of elongate article 100.

Figure 21:
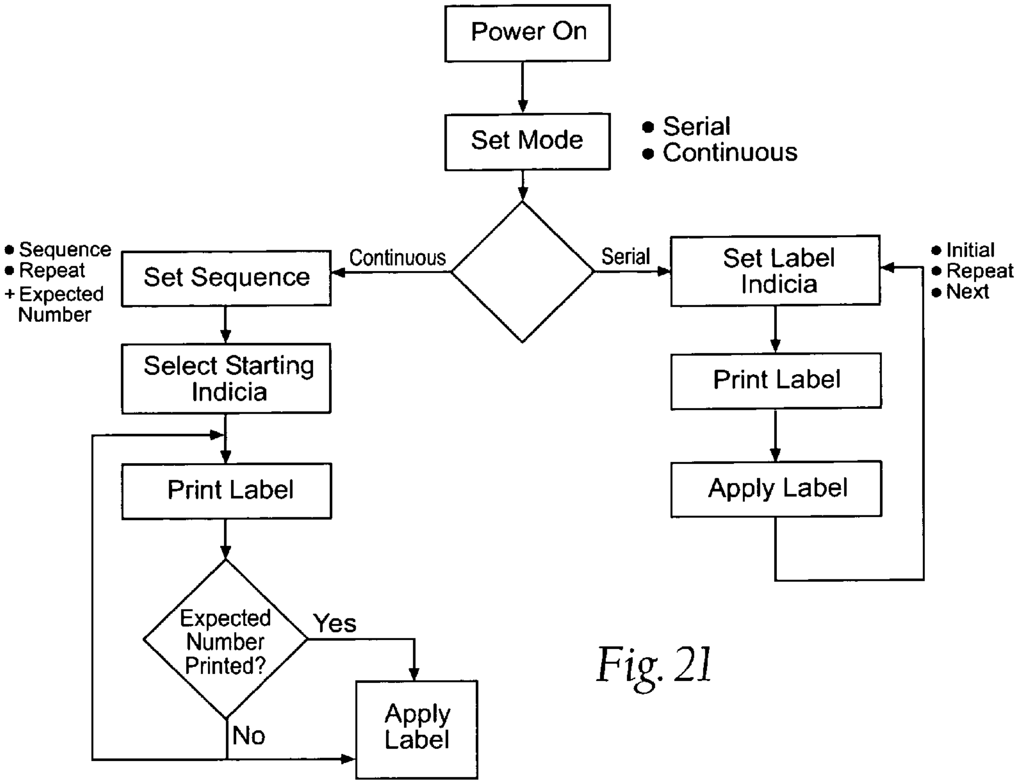
FIG. 21 is a flow chart depicting two preferred modes of operation of the apparatus of FIG. 1.

The above application cycle, as described with reference to FIGS. 20A-N, may be run in a number of different ways. Preferably, two modes of printing and application are provided; a serial mode and a continuous mode. FIG. 21 depicts the general flow of both modes. First, power is supplied to the apparatus 1. Next, a mode of operation is selected, preferably via the display 230 or the off-board device 220. The selected mode of operation indicates to the controller 2 or the off-board device 220 the manner in which the apparatus 1 should be synchronized.

In serial mode, a user first affirmatively selects label indicia. In normal operation, the first label to be applied will normally have printed thereon selected START indicia. The START indicia may be entered manually or selected from a list of loaded indicia. The user then activates a serial cycle by providing input to the apparatus 1 either through the display 230, the cycle actuator 240, or the off-board device 220. The serial cycle includes the printing of the selected indicia onto a label and the application of the printed label onto an elongate article. After a serial cycle is complete, the user then affirmatively begins a new serial cycle by selecting NEXT indicia or REPEAT indicia to be printed. NEXT indicia will print the next label with a sequential number following the previous indicator and a predetermined pattern. REPEAT indicia will reprint the previous indicator. The next label is then printed with either the NEXT indicia or REPEAT indicia and applied to a subsequent elongate article.

In continuous mode, a user first affirmatively selects a sequence of label indicia. Preferably, at least two sequences are provided; SEQUENCE and REPEAT. Also, the user indicates an expected number of labels to be applied during the labeling session. Next, the user selects START indicia. The START indicia will serve as the base indicia, to be incremented in the SEQUENCE mode and will serve as the only indicia in the REPEAT mode. The user then activates a first continuous cycle including the printing of a first label and the application of the first label to a first elongate article 100. While the first label is being applied to the first elongate article, a second label is printed with indicia, either START indicia in REPEAT mode or modified START indicia in SEQUENCE mode. Upon application completion of the first label, the printed second label is conveyed to the proper application position as detected by the label wrap sensor 404 in preparation for the next application. The user then affirmatively initiates only the application of the second and subsequent labels to subsequent elongate objects 100. Once the expected number of labels has been printed, the print station 7 does not simultaneously print another label while the final label is being applied.

Apparatus as Component

Figure 22:
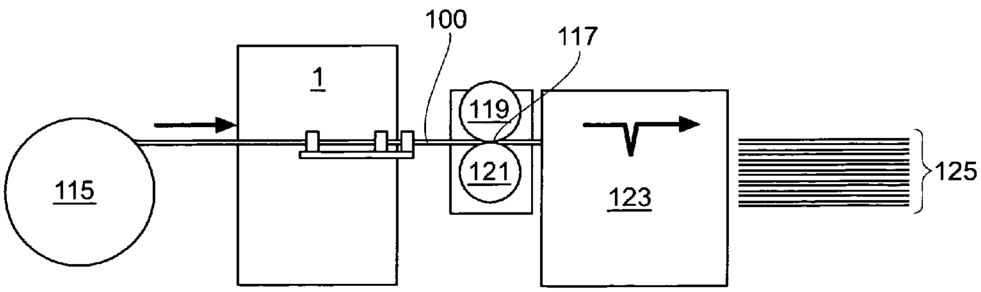
FIG. 22 is a diagrammatic representation of a system incorporating an embodiment of the present invention for placing labels on wire continuously fed from a spool.

FIG. 22 shows a use of the apparatus 1 in combination with a continuous supply 115 of elongate object 100 material. It may be desirable to produce a plurality of elongate objects 125, which are labeled in a consistent manner. The elongate object material 100 may be fed from a supply roll 115, through the apparatus gripping members 833, through a nip 117 of a pair of draw rollers 119,121 and a cutter 123. In this manner, the draw rollers 119,121 may be controlled in such a manner so as to draw the material 100 through the apparatus 1 a predetermined distance. Subsequent to label application, the material 100 can then be cut by the cutter 123 to form a plurality of consistently labeled elongate articles 125. Control of the draw rollers 119,121 may be provided by the apparatus 1, itself, or they may be controlled in a separate manner.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

What is claimed is:

1. A labeling apparatus in which pressure sensitive adhesively backed labels which are releasably adhered to a backing strip are each respectively marked with indicia and attached to an elongate object, said apparatus comprising:

a structural support member;

a label supply roller, coupled to said support member, for supplying said labels and adhered backing strip to said apparatus;

label guide means for moving said labels through said apparatus;

a label print station, coupled to said support member, for marking indicia on said labels;

a label peeler, coupled to said support member, for removing said labels from said backing strip wherein said label peeler includes a label peel plate, a peel spring, and a label peel roller set;

a puck assembly rotatably coupled to said support member, said puck assembly including a puck member having an interrupted circumferential surface defining an opening;

a gripper assembly, coupled to said support member, for grasping and moving said elongate object relative to said opening; and a take-up roll, rotatably coupled to said support member, for receiving said backing strip.

2. The apparatus of claim 1 wherein said opening of said puck member further includes a spring loaded entrance door.

3. The apparatus of claim 1 wherein said gripper assembly moves said elongate object in a substantially linear path relative to said opening.

4. The apparatus of claim 1 wherein said label peel roller set includes a knurled drive roller and a selectively engageable idler roller.

5. The apparatus of claim 4 wherein said label peel roller set meets at a nip, said nip adapted to receive label therethrough.

* * * * *